US012300887B2

(12) United States Patent
Barrett

(10) Patent No.: US 12,300,887 B2
(45) Date of Patent: May 13, 2025

(54) REFLECTOR ANTENNAS AND RELATED METHODS

(71) Applicant: The Boeing Company, Arlington, VA (US)

(72) Inventor: James Timothy Barrett, Playa Del Rey, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/185,933

(22) Filed: Mar. 17, 2023

(65) Prior Publication Data

US 2024/0313416 A1 Sep. 19, 2024

(51) Int. Cl.
*H01Q 15/16* (2006.01)
*H01Q 1/28* (2006.01)
*H01Q 19/12* (2006.01)

(52) U.S. Cl.
CPC ........... *H01Q 15/161* (2013.01); *H01Q 1/288* (2013.01); *H01Q 19/12* (2013.01)

(58) Field of Classification Search
CPC ....... H01Q 1/288; H01Q 15/161; H01Q 19/12
See application file for complete search history.

(56) References Cited

U.S. PATENT DOCUMENTS 4,701,765 A 10/1987 Arduini et al.
10,811,759 B2 10/2020 Taylor
2011/0187627 A1* 8/2011 Palmer ................. H01Q 15/161 343/915
2016/0352022 A1* 12/2016 Thomson ............... H01Q 1/288
2020/0203798 A1* 6/2020 Freebury .............. H01Q 19/193
2024/0313393 A1* 9/2024 Barrett ................. H01Q 15/161

FOREIGN PATENT DOCUMENTS

CN 112531349 A * 3/2021 ........... H01Q 15/161
CN 115588856 A * 1/2023
WO WO-2024096513 A1 * 5/2024 ............. C30B 25/08

OTHER PUBLICATIONS

"Parabolic Reflector Antenna Feed Systems," Electronics Notes, Accessed on Mar. 22, 2023, Retrieved from the Internet: https://www.electronics-notes.com/articles/antennas-propagation/parabolic-reflector-antenna/feeder-feed-systems.php#:~: text=Focal%20feed%20system,it%20illuminates%20the%20reflecting%20surface, 5 pages.
Clelford, Tamara, "Let's Talk About Reflector Antennas," Apr. 15, 2019, Retrieved from the Internet: https://swamphen.co.uk/new-blog/2019/4/15/lets-talk-about-reflector-antennas, 7 pages.

(Continued)

*Primary Examiner* — Dameon E Levi
*Assistant Examiner* — Leah Rosenberg
(74) *Attorney, Agent, or Firm* — Hanley, Flight & Zimmerman, LLC

(57) ABSTRACT

Reflector antennas and related methods are disclosed. An example antenna includes a base; a first rib and a second rib, the first rib and the second rib moveable relative to the base; a reflective material carried by the first rib and the second rib, the first rib, the second rib, and the reflective material to define a reflector portion of the antenna; and a gold-plated clip to couple a portion of the reflective material to the first rib.

20 Claims, 15 Drawing Sheets

(56) References Cited

OTHER PUBLICATIONS

"Unfurlable Mesh Reflector Antennas," L3Harris, Accessed on Mar. 22, 2023, Retrieved from the Internet: https://www.I3harris.com/all-capabilities/unfurlable-mesh-reflector-antennas, 10 pages.
Composite Technology Development, Inc. "Tembo Shape Memory Polymers and Elastic Memory Composites," Accessed on Mar. 31, 2023, Retrieved from the Internet: https://ctd-materials.com/engineered-materials/tembo/, 4 pages.
University of Cambridge, "Elastic Folding of Reflector Antennas," Accessed on Mar. 31, 2023, Last Updated Aug. 10, 2001, Retrieved from the Internet: http://www-civ.eng.cam.ac.uk/dsl/ltdish.html, 3 pages.
Tankersley et al., "Largest Mesh Deployable Antenna Technology," (1982), The Space Congress® Proceedings, 4, <https://commons.erau.edu/space-congress-proceedings/proceedings-1982-19th/session-9/4>, 22 pages.

* cited by examiner

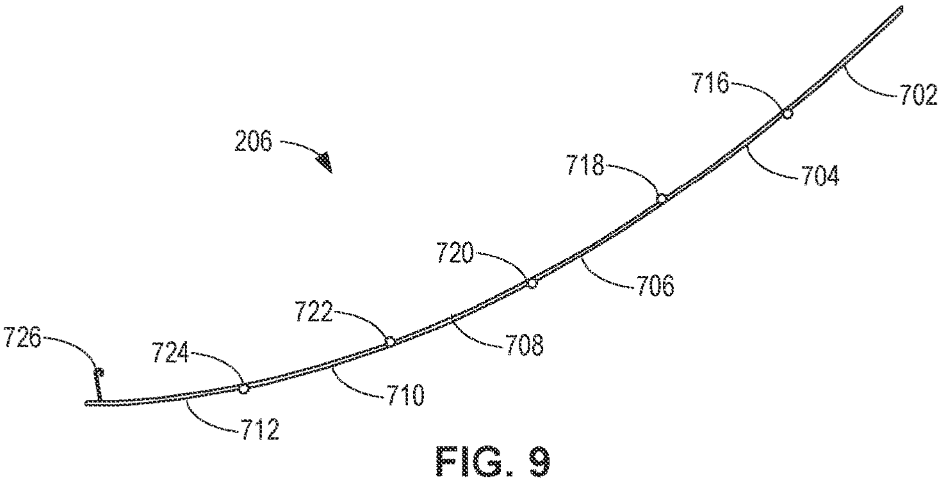
FIG. 9
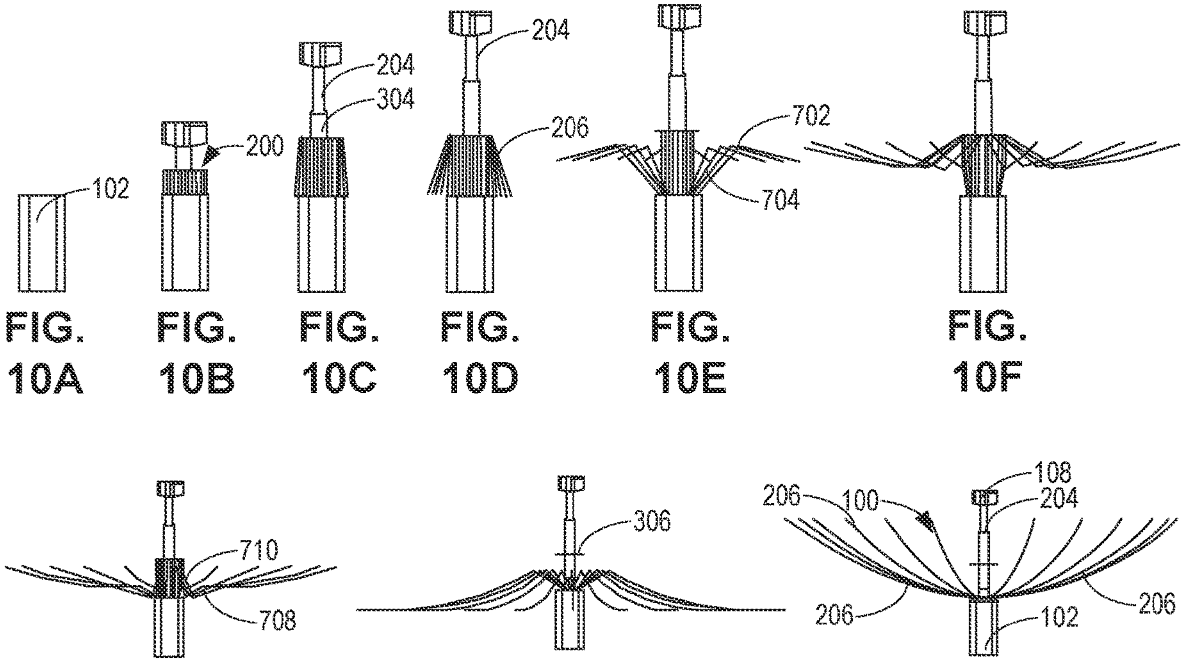
FIG. 10A FIG. 10B FIG. 10C FIG. 10D FIG. 10E FIG. 10F
FIG. 10G FIG. 10H FIG. 10I

REFLECTOR ANTENNAS AND RELATED METHODS

FIELD OF THE DISCLOSURE

This disclosure relates generally to antennas and, more particularly, to reflector antennas and related methods.

BACKGROUND

An antenna carried by, for instance, a satellite, may be in a stowed configuration during launch and deployed when the satellite is in orbit. In the deployed configuration, the antenna can transmit and/or receive radio frequency waves.

SUMMARY

An example antenna includes a hub; ribs coupled to the hub; a reflective material; gold-plated clips coupling the reflective material to respective ones of the ribs; and an actuator to cause respective ones of the ribs to move relative to the hub from a folded position to an unfolded position to expand the reflective material.

Another example antenna includes a hub including a base and a shaft; a rib coupled to the base when the rib is in a folded position, the rib moveable relative to the shaft from the folded position to an unfolded position; a gold-plated mesh, a portion of the gold-plated mesh coupled to the rib; a gold-plated clip coupled to the rib, the portion of the gold-plated mesh between the gold-plated clip and the rib; and a hold down release mechanism to cause the rib to move from the folded position to the unfolded position to deploy the antenna, the gold-plated mesh to define a reflector portion of the antenna.

Another example antenna includes a base; a first rib and a second rib, the first rib and the second rib moveable relative to the base; a reflective material carried by the first rib and the second rib, the first rib, the second rib, and the reflective material to define a reflector portion of the antenna; and a gold-plated clip to couple a portion of the reflective material to the first rib.

Another example antenna includes a housing; a hub; a rib carried by the hub, the rib including a first rib segment and a second rib segment, the hub moveable relative to the housing between a first position in which the rib is folded in the housing and a second position in which the rib is external to the housing; a reflective material; one or more gold-plated clips coupling the reflective material to the rib; and an actuator to cause hub to move relative to the housing from the first position to the second position, the second rib segment to move in response to movement of the first rib segment when the rib is external to the housing to unfold the rib.

Another example antenna includes a hub including a base, a rim disposed about the base, and a cap; a hinge coupled to the rim; a rib, a first end of the rib coupled to the hinge, the rib moveable between a folded position in which a second end of the rib is coupled to the cap and an unfolded position in which the second end of the rib is released from the cap; a reflective material; one or more gold-plated clips coupling the reflective material to the rib; and an actuator carried by the cap, the actuator to cause a portion of the cap to move to release the second end of the rib from the cap.

An example satellite antenna includes a hub; a plurality of ribs carried by the hub, each of the ribs moveable between a folded position and an unfolded position; a reflective material; a plurality of gold-plated clips to couple the reflective material to the respective ones of the ribs, the reflective material folded when the ribs in are in the folded position; and an actuator to cause the ribs to move from the folded position to the unfolded position to expand the reflective material.

BRIEF DESCRIPTION OF THE DRAWINGS

FIG. 9 illustrates the rib of FIG. 7 in an unfolded position.

FIG. 10A, FIG. 10B, FIG. 10C, FIG. 10D, FIG. 10E, FIG. 10F,

FIG. 10G, FIG. 10H, and FIG. 10I illustrate a sequence of deployment of the example antenna of FIGS. 1-9 from a stowed configuration to a deployed configuration in accordance with teachings of this disclosure.

In general, the same reference numbers will be used throughout the drawing(s) and accompanying written description to refer to the same or like parts. The figures are not to scale.

Figure 2:
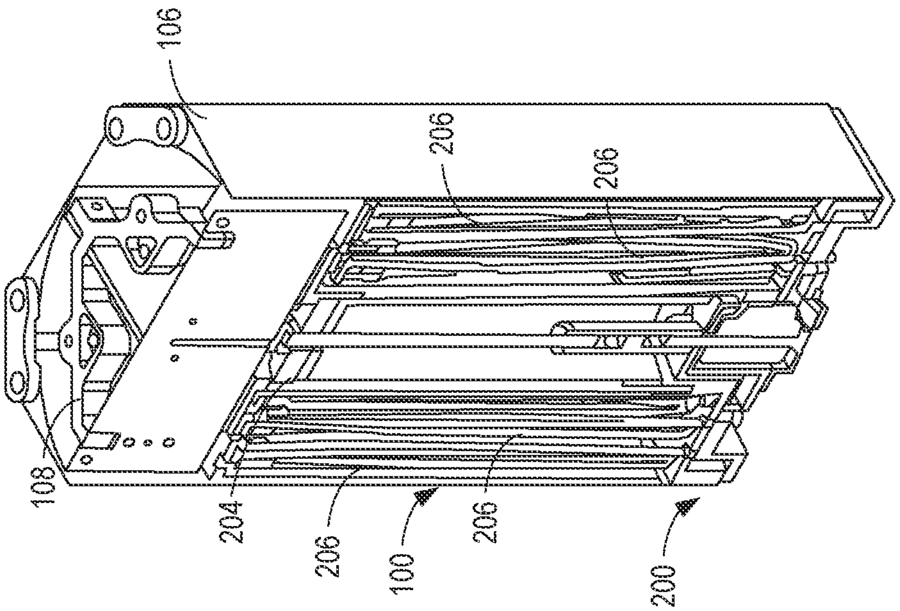
FIG. 2 is a cross-sectional view of the example antenna of FIG. 1 in the housing taken along the 2-2 line of FIG. 1.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, stating that any part is in "contact" with another part is defined to mean that there is no intermediate part between the two parts.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Small satellites weighing, for example, less than 100 kilograms, have increased performance capabilities such that high gain antennas should be used to match the satellite performance and enable the satellite to complete intended missions. However, the stowed payload volume of the satellite remains limited. Further, loads experienced by the satellite during launch may prevent the feasibility of open antennas from protruding from the satellite during launch. Some known configurations for folding components of an antenna, such as the reflector portion, are limited with respect to the compact form factor that can be achieved. For example, some known antennas use a pleated fold configuration (e.g., S-fold design similar to a coffee filter) for a carbon fiber reflector of the antenna. However, such a fold design is limited with respect to the stowage dimensions that can be achieved without cracking the carbon fiber reflector. Further, such foldable reflector designs can increase manufacturing costs and efforts.

Some deployable reflector antennas use a metal mesh material as a reflective surface to provide for electrical conductivity for the surface reflection of electric and magnetic fields in a form factor that facilitates storage in small volumes. However, known methods for attaching the mesh to support surfaces (e.g., ribs, spars) of the antenna typically involves threading the mesh to the support surfaces. Threading is typically performed by hand stitching, which is labor intensive. Further, the thread can deteriorate over time, which can affect performance of the antenna by decreasing surface accuracy of the reflecting portion of the antenna, as the mesh is no longer held in tension or is held in reduced tension across the reflector portion.

Disclosed herein are example reflector antennas that fit, when stowed, in a constrained payload volume of a satellite and can be opened to protrude from an outer face of the satellite. Example antennas disclosed herein enable the ribs and reflective material (e.g., mesh) to fold in a compact manner and self-expand into a substantially parabolic shape (or other shape) upon deployment. Example antennas disclosed herein further provide for efficient attachment of the reflective material to the ribs that reduces labor as compared to threading techniques.

Some example antennas disclosed herein provide for off-line stowage packing of the antenna in a housing for integration into a satellite (e.g., satellite bus) and self-deployment from the housing in response to actuation commands when the satellite is in orbit. The ribs are mechanically self-sequenced to prevent interference, tangling, or snagging of the reflective material carried by the ribs. When stowed, the ribs can be folded in a Z-fold configuration to increase a compactness factor of the stowed antenna. An actuator or release mechanism can cause stored potential energy (e.g., springs) to lift a hub that supports the ribs from the housing. When exterior to the housing, the ribs self-actuate and extend radially to define a parabolic shape reflector portion of the antenna. Also, the release mechanism enables a telescoping mast to self-extend via the stored potential energy to raise a feed of the antenna.

Some example antennas disclosed herein include a reflector portion defined by carbon fiber ribs and a mesh made of reflective material. As compared to a reflector portion made entirely or substantially entirely of carbon fiber, the hybrid carbon fiber rib and mesh combination enables the reflector portion to be folded into a smaller form factor. The antenna can be stored in a payload fairing during launch. Upon actuation of a release mechanism, the ribs are uncoupled from a first portion of a hub of the antenna and pivot about a second portion of the hub (e.g., via hinges) to define the reflector portion of the antenna. Example antennas include mechanical stops to support the ribs in a curved (e.g., substantially parabolic) shape to define the reflector portion of the antenna.

Examples disclosed herein provide for reflective materials in the form of a mesh that provides for conductivity and fill area (e.g., percent of open area to wire crossings) to define a maximum frequency of operation of the antenna based on particular satellite missions. Example reflective materials disclosed herein include a gold plated mesh made by weft knitting. Weft knitting can provide for a mesh (e.g., mesh gores) having finished edges as compared to other techniques that may result in unfinished edges of the mesh.

Also disclosed herein are mesh attachment techniques that provide for long-term coupling of the reflective material to the ribs of the antenna with reduced labor as compared to hand-stitching. Example attachment techniques include sandwiching the mesh between a hook and loop material, where the hook material is coupled to the rib. Clips are placed over the loop material and coupled to the rib. The clips provide for redundancy in coupling the mesh to the ribs in the event that the hook and loop material degrades or disintegrates over time due to effects of the space environment during orbit of the satellite. In some instances, the disclosed attachment techniques can be performed using single-person attachment instead of multi-person attachment. Example attachment techniques also permit incremental removal of improperly attached pieces of material and long term coupling of the mesh without hand stitching.

In examples disclosed herein, the clips used to couple the mesh to the ribs are gold-plated. Example clips disclosed herein provide for corrosion mitigation across the operational side of the reflector. The gold-plated clips provide for space charge mitigation across the reflector. Also, when used with the gold-plated mesh, the gold-plated clips reduce passive intermodulation (PIM) effects (e.g., signal distortion) that could otherwise result if the contact interfaces between the clip and mesh were formed of different types of or dissimilar metals.

Figure 1:
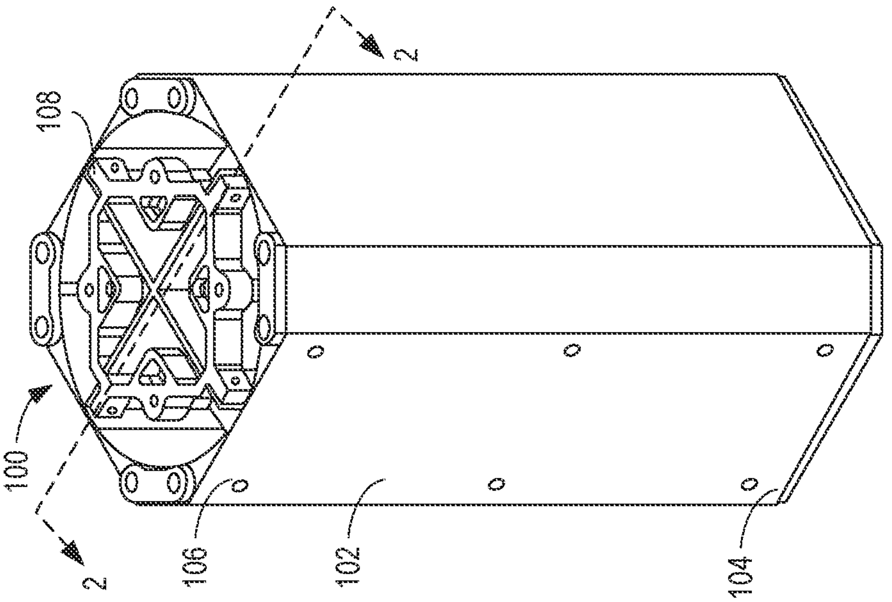
FIG. 1 illustrates a first example reflector antenna in a stowed configuration in accordance with teachings of this disclosure.

FIG. 1 illustrates a first example reflector antenna 100 in accordance with teachings of this disclosure. The example antenna 100 can be carried by, for instance, a satellite. In the example of FIG. 1, the antenna 100 is in a stowed configuration. The example antenna 100 includes a housing 102 to carry components of the antenna 100 when the antenna 100 is in the stowed configuration. Put another away, the housing 102 defines a canister to hold the components of the antenna 100 in the stowed configuration.

The housing 102 has a first end 104 and a second end 106 opposite the first end 104. The example antenna 100 of FIG. 1 includes a feed 108 to facilitate transmission of signals (e.g., current) to or from the antenna 100 when the antenna 100 is in a deployed configuration (i.e., exterior to the housing 102). The feed 108 can include an ultra-wideband feed with a frequency range of 800-6000 MHz. As disclosed herein, when the antenna 100 moves from the stowed configuration of FIG. 1 to the deployed configuration (FIG. 11), a mast of the antenna 100 causes the feed 108 to extend from second end 106 of the housing 102 (as disclosed in connection with FIGS. 5, 6 and 10A-10I). Also, as disclosed herein, in the deployed configuration, a reflective material (e.g., a metallized mesh) of the antenna 100 is exterior to the housing 102. The reflective material (FIG. 11) defines a reflector portion (e.g., a dish) of the antenna 100 that can modify or redirect radio frequency energy relative to the feed 108. The example antenna 100 of FIG. 1 is a prime-focus antenna such that in the deployed configuration, the feed 108 is located at the focus of a parabola defined by the reflector portion.

The example housing 102 can be formed from a material such as metal (e.g., aluminum). In the example of FIG. 1, the housing 102 has a substantially rectangular shape. The housing 102 can have length, width, and height dimensions of, for example, 10 centimeters (cm), 10 cm, and 20 cm, respectively. A shape or a size of the housing 102 can differ from the example shown in FIG. 1.

FIG. 2 is a cross-sectional view of the example antenna 100 of FIG. 1 taken along the 2-2 line of FIG. 1. The example antenna 100 includes a hub 200. The hub 200 supports a mast 204 and a plurality of ribs 206 of the antenna 100. A reflective material (not shown) is coupled to (e.g., stitched to) the ribs 206 and stored in the housing 102. The mast 204 supports (e.g., carries) the antenna feed 108.

In the example of FIG. 2, the ribs 206 are shown in a folded position. The example antenna 100 of FIG. 2 includes twenty-four ribs 206. However, the antenna 100 can have additional or fewer ribs 206. The ribs 206 can be made of a conductive material (e.g., a metal, carbon fiber).

As disclosed herein, activation of a hold down release mechanism (FIG. 5) causes the hub 200 to be lifted from the housing 102 such that the mast 204, the feed 108, and the ribs 206 are external to the housing 102. The ribs 206 are defined by foldable segments. When the ribs 206 are exterior to the housing 102, the segments of each rib 206 extend radially to move the rib 206 from the folded position of FIG. 2 to an unfolded position (FIG. 9).

The ribs 206 support the reflective material (FIG. 11) that defines a reflector portion (e.g., a dish) of the antenna 100. When the ribs 206 are in the unfolded position, the ribs 206 form a parabolic shape to support the reflective material. However, the ribs 206 can define other shapes of the reflector portion (e.g., arbitrary shapes). The number of ribs 206 of the antenna 100 can be selected to affect a surface accuracy of the antenna 100. The surface accuracy of the reflector portion of the antenna 100 is correlated to the number of ribs 206 around a circumference of the reflector portion, as the reflective material is pulled taut or in tension between the ribs 206.

Figure 4:
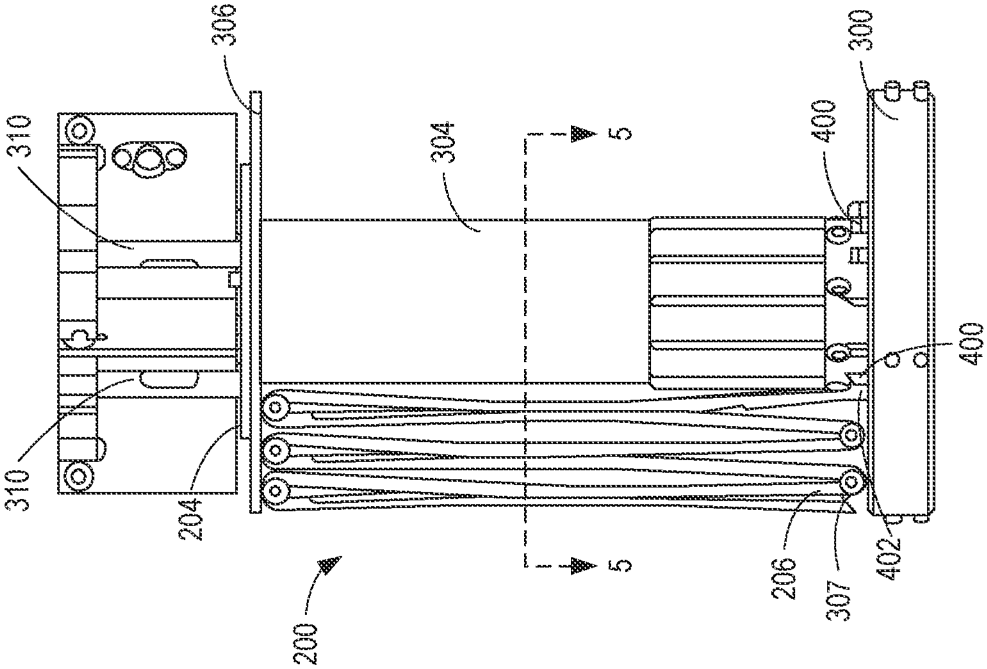
FIG. 4 is a side view of a portion of the example antenna of FIG. 3 including the hub and one of the ribs.
Figure 3:
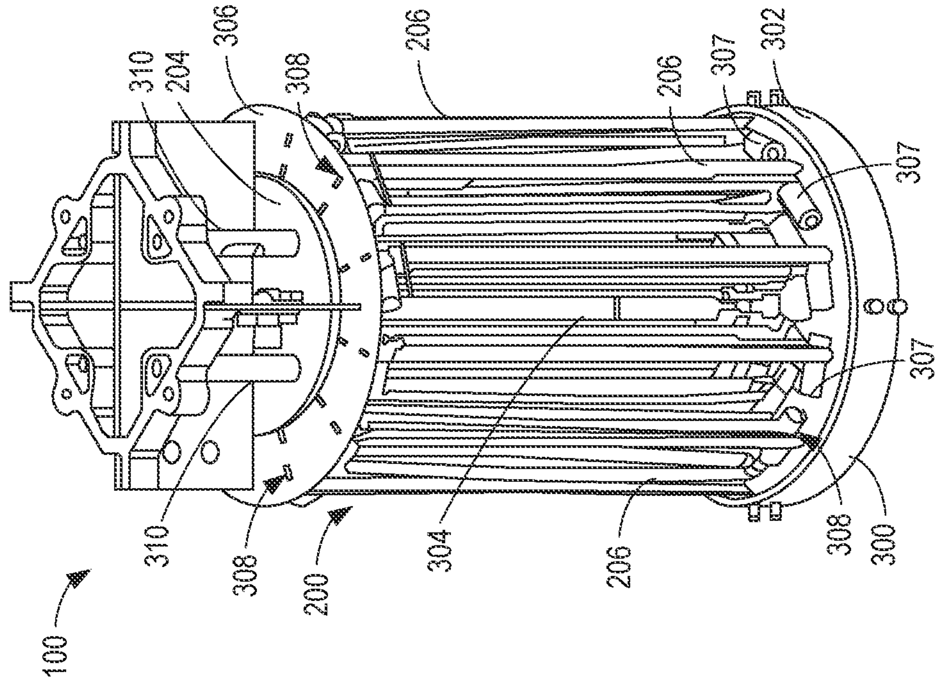
FIG. 3 illustrates the example antenna of FIGS. 1 and 2 including ribs in a folded position and supported by a hub.

FIG. 3 illustrates the example antenna 100 of FIGS. 1 and 2 and, in particular, the hub 200 and the ribs 206 of the antenna 100. FIG. 4 is a side view of a portion of the antenna 100 including one of the ribs 206 and the hub 200. For illustrative purposes, the housing 102 is not shown in FIGS. 3 and 4. Also, for illustrative purposes, only one of the ribs 206 is shown in FIG. 4.

The example hub 200 includes a base or platform 300 that defines a first end of the hub 200. A shaft 304 of the hub 200 extends from the platform 300. A cap or plate 306 is coupled to the shaft 304 and defines a second end of the hub 200 opposite the first end defined by the platform 300.

As shown in FIG. 3, the plate 306 includes apertures or slots 308 defined therein. The platform 300 includes corresponding slots defined therein (i.e., slots 308 aligned or substantially aligned with the slots 308 defined in the plate 306, not show). As disclosed herein, projections, hooks, or tangs of the segments defining the respective the ribs 206 are movably received in corresponding ones of the slots 308 of the plate 306 and the platform 300. Each of the rib segments defining the rib 206 is coupled to another rib segment via joints 307 to enable movement of the segments and, thus, removal of the tangs from the slots 308 during extension of the ribs 206.

Referring to FIG. 4, the platform 300 supports hinges 400 that receive a portion of the respective ribs 206 to couple the ribs 206 to the hub 200. The hinges 400 can be arranged about the shaft 304. For illustrative purposes, one of the ribs 206 having an end 402 coupled to a corresponding hinge 400 is shown in FIG. 4.

The shaft 304 defines a housing to receive the mast 204 of the antenna 100 therein. A portion of the mast 204 extending from the shaft 304 is shown in FIGS. 3 and 4. The feed 108 is coupled to the mast 204 via mechanical fasteners 310 (two of which are shown in FIGS. 3 and 4).

Figure 5:
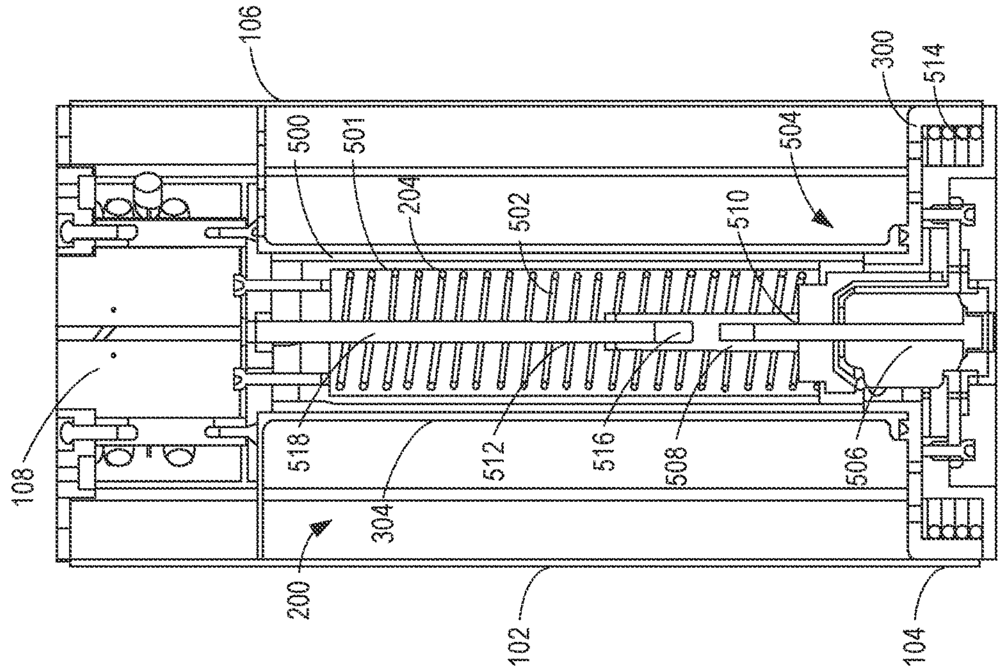
FIG. 5 is a cross-sectional view of the hub of FIGS. 3 and 4 taken along the 5-5 line of FIG. 4 and shown in a housing.

FIG. 5 is a cross-sectional view of the hub 200 taken along the 5-5 line of FIG. 4. For further illustration, in FIG. 5, the hub 200 is shown in stored in the housing 102 of FIGS. 1 and 2. Also, for illustrative purposes, the ribs 206 are not shown in FIG. 5.

FIG. 5 shows the mast 204 of the antenna 100 substantially disposed in the shaft 304 of the hub 200 when the hub 200 is stored in the housing 102. The example mast 204 of FIG. 5 includes a first section 500 and a second section 501. The first and second sections 500, 501 are nested or telescoping sections. As shown if FIG. 5, the second section 501 is nested in the first section 500. A first spring 502 is disposed in the mast 204. The first spring 502 is compressed when the mast 204 is nested in the shaft 304 as shown in FIG. 5.

A second spring 514 is disposed in the housing 102 proximate to the first end 104 of the housing 102. The second spring 514 is compressed by the hub 200 (e.g., the platform 300 of the hub 200) when the hub 200 is stored in the housing 102 as shown in FIG. 2.

The housing 102 includes an actuator or a hold down release mechanism 504 that, when activated, enables the hub 200 to move out of the second end 106 of the housing 102 via potential energy stored in the springs 502, 514. The hold down release mechanism 504 can include, for example, a pin puller, a latch, a Frangibolt® actuator), or other mechanical device that enables movement on command. In the example of FIG. 5, the hold down release mechanism 504 includes a first housing 506 and a second housing 508. A first fastener 510 (e.g., a bolt) couples the first housing 506 and the second housing 508. When the hub 200 is disposed in the housing 102, the hub 200 extends over the hold down release mechanism 504 such that the second housing 508 and at least a portion of the first housing 506 of the hold down release mechanism 504 are disposed in the shaft 304 of the hub 200.

A second fastener 512 extends through the mast 204 into the second housing 508 of the hold down release mechanism 504. As disclosed herein, the mast 204 is disposed in the shaft 304 of the hub 200 when the hub 200 is stored in the housing 102. Thus, when the second fastener 512 is coupled to the second housing 508, the hub 200 is secured or fixed in the housing 102 via the hold down release mechanism 504.

In the example of FIG. 5, a first portion 516 of the second fastener 512 is frangible (e.g., the second fastener 512 includes a frangible nut, the second fastener 512 is a Frangibolt© actuator, etc.). When the frangible portion 516 of the second fastener 512 is exposed to heat, the frangible portion 516 splits, breaks, or otherwise separates from a second portion 518 of the second fastener 512. Thus, the remaining second portion 518 of the second fastener 512 is no longer coupled to the second housing 508 of the hold down release mechanism 504.

When the frangible portion 516 of the second fastener 512 separates from the second portion 518, the mast 204 is no longer coupled to the second housing 508 of the hold down release mechanism 504 and the compression of the first spring 502 is released. Thus, the mast 204 is free to move relative to the housing 102. The first spring 502 extends to push the telescoping sections 500, 501 of the mast 204 out of the shaft 304 of the hub 200 and, thus, out of the housing 102.

Also, when the portions 516, 518 of the second fastener 512 separate, the platform 300 is no longer held (e.g., fixed) in the housing 102 by the hold down release mechanism 504. Thus, the compressive force exerted on the second spring 514 by the platform 300 is released. The second spring 514 moves from a compressed position to an expanded position in response to release of the tension. As the second spring 514 expands, the second spring 514 pushes or lifts the platform 300 toward the second end 106 of the housing 102. Thus, at the same time or substantially the same time that the mast 204 is moving from a nested position to an extended telescope position via the first spring 502, the second spring 514 is lifting the hub 200 out of the housing 102 by raising the platform 300.

Therefore, actuation of the hold down release mechanism 504 causes the stored potential energy of the springs 502, 514 to be released. As a result, the hub 200, including the mast 204 and ribs 206 (not shown) and the feed 108 supported by the mast 204 are raised or released from the housing 102. The hold down release mechanism 504 can be actuated in response in response to instructions output by, for instance, processor circuitry (FIG. 11) of a satellite based on rule(s) defining a time in which the antenna 100 should be deployed.

Figure 6:
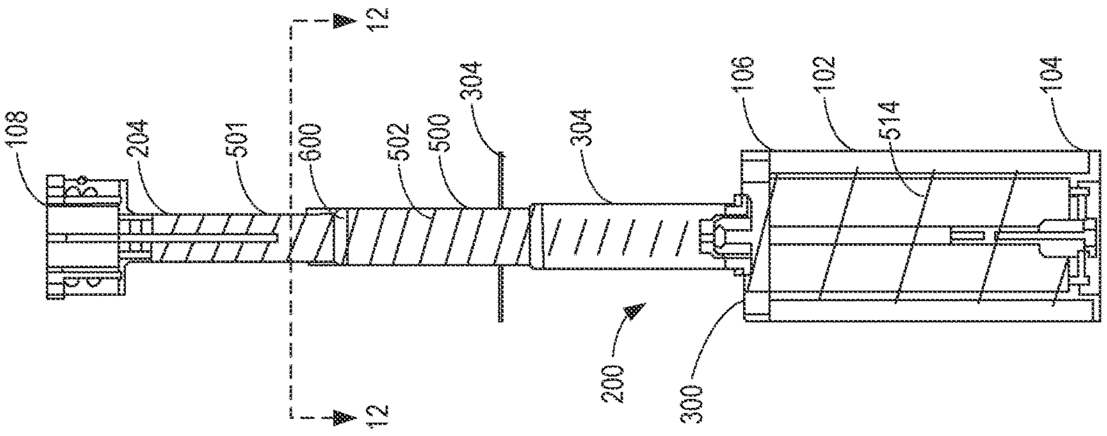
FIG. 6 illustrates a mast of the hub of the example antenna of FIGS. 1-3 in a raised position relative to the housing of FIG. 5.

FIG. 6 illustrates the hub 200 of the example antenna 100 of FIGS. 1-5 in a raised position relative to the housing 102 after actuation of the hold down release mechanism 504. In particular, FIG. 6 shows extension of the mast 204. For illustrative purposes, the ribs 206 are not shown in FIG. 6.

As shown in FIG. 6, the second section 501 of the mast 204 is extended relative to the first section 500 of the mast 204 via extension of the first spring 502 (e.g., via a friction fit between the first and second sections 500, 501). The mast 204 includes a stop 600 to enable the second section 501 to remain exterior relative to the first section 500 of the mast 204 and to fix the mast 204 in the extended position. As shown in FIG. 6, the shaft 304 of the hub 200 is extended from the housing 102. Thus, the shaft 304 contributes additional length to raising the feed 108 relative to the housing 102 in addition to sections 500, 501 of the mast 204.

As also shown in FIG. 6, the platform 300 has moved from the first end 104 of the housing 102 to the second end 106 of the housing 102 via extension of the second spring 514. The platform 300 can move (e.g., slide) toward the second end 106 of the housing 102 until, for example, a portion of the platform 300 engages stops in the housing 102 (e.g. protrusions in the housing 102). In the raised position, the platform 500 is supported or at least partially supported by the spring 514. In some examples, at least a portion of the platform 300 is exterior to the housing 102. Thus, the axial movement of the second spring 514 relative to the housing 102 causes the hub 200 to be substantially lifted from the housing 102 (e.g., the platform 300 is at least partially external to the housing 102, the shaft 304 and the plate 306 are fully external to the housing 102). Also, the axial movement of the first spring 502 cause the sections 500, 501 of the mast 204 to extend from the shaft 304 of the hub 200 to increase the distance between the housing 102 and the feed 108.

As disclosed herein (FIGS. 2-4), the ribs 206 are carried by the hub 200 between the platform 300 and the plate 306 when the hub 200 is in the housing 102 (i.e., the antenna 100 is in the stowed configuration). When the hub 200 is substantially exterior to the housing 102 as shown in FIG. 6, the ribs 206 carried by the hub 200 move from a folded position to an unfolded position. As a result of unfolding of the ribs 206, the reflective material (FIG. 11) carried by the ribs 206 is expanded.

Figure 7:
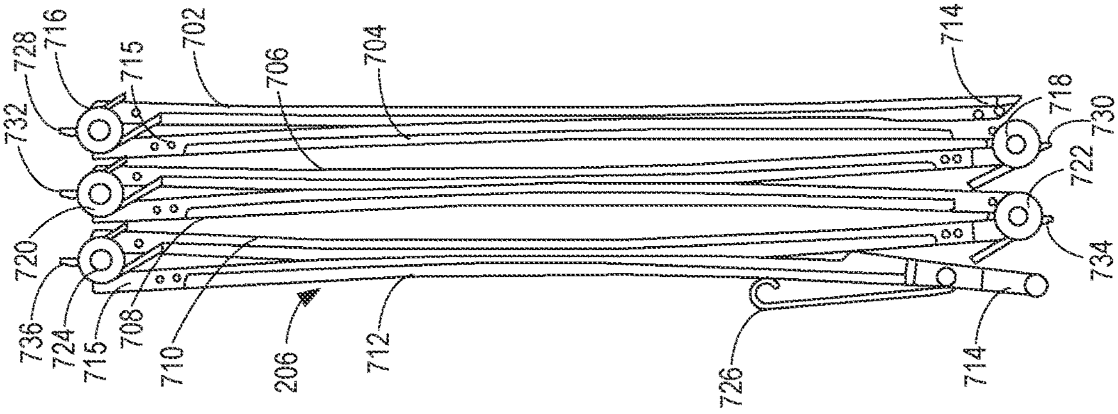
FIG. 7 illustrates one of the ribs of the example antenna of FIGS. 1-6.

FIG. 7 illustrates an example of one of the ribs 206 of FIG. 2 of the antenna 100 of FIGS. 1-6 in the folded position. The rib 206 is defined by two or more rib segments. In the example of FIG. 7, the rib 206 includes six rib segments, namely, a first rib segment 702, a second rib segment 704, a third rib segment 706, a fourth rib segment 708, a fifth rib segment 710, and a sixth rib segment 712. However, the rib 206 can be defined by additional or fewer rib segments. The number of ribs segments of the rib 206 can be selected to achieve a particular a diameter the reflector portion (e.g., a dish) of the antenna 100.

The rib segments 702, 704, 706, 708, 710 include first ends 714 and second or opposing ends 715. The rib segments 702, 704, 706, 708, 710, 712 are pivotably coupled via joints (e.g., the joints 307 of FIG. 3) at one or more of the ends 714, 715 of the respective rib segments 702, 704, 706, 708, 710, 712. For example, as shown in FIG. 7, a first joint 716 couples the first rib segment 702 and the second rib segment 704, a second joint 718 couples the second rib segment 704 and the third rib segment 706, a third joint 720 couples the third rib segment 706 and the fourth rib segment 708, a fourth joint 722 couples the fourth rib segment 708 and the fifth rib segment 710, and a fifth joint 724 couples the fifth rib segment 710 and the sixth rib segment 712.

The end 714 of the sixth rib segment 712 (e.g., the end 402 of FIG. 4) is coupled to one of the hinges 400 (FIG. 4) to couple the rib 206 to the hub 200. The sixth rib segment 712 includes a hook-ended arm spring 726 coupled to the end 714 of the sixth rib segment 712. The hook-ended arm spring 726 is used to push the sixth rib segment 712 (i.e., the rib segment closest to the shaft 304) away during extension of the rib 206 via the curved hook end sliding along the shaft 304.

The first through fifth rib segments 702, 704, 706, 708, 710 include tangs or protrusions at least partially extending past the joints 716, 718, 720, 722, 724. As shown in FIG. 7, the first rib segment 702 includes a first tang 728, the second rib segment 704 includes a second tang 730, the third rib segment 706 includes a third tang 732, the fourth rib segment 708 includes a fourth tang 734, and the fifth rib segment 710 includes a fifth tang 736. As disclosed in connection with FIG. 3, the tangs 728, 730, 732, 734, 736 are at least partially disposed in the slots 308 of the plate 306 and the platform 300 of the hub 200 when the rib 206 is coupled to the hub 200. The tangs 728, 730, 732, 734, 736 can have different shapes and/or sizes than the examples shown in FIG. 7.

When the example rib 206 is folded as shown in FIG. 7, the rib segments 702, 704, 706, 708, 710, 712 define a Z-fold or substantially Z-fold configuration. The Z-folded configuration enables the rib segments 702, 704, 706, 708, 710, 712 to be disposed closer together (i.e., more compact in the housing 102) as compared to a fold configuration in which the ribs segments would be spaced further apart, such as a C-fold configuration. As a result of the substantially compact fold design of the rib segments 702, 704, 706, 708, 710, 712, an increased number of ribs 206 to support the reflective material can be supported by the hub 200 and disposed in the housing 102 as compared to other fold designs. Further, a diameter of the housing 102 can be reduced because of the compact folding of the rib segments 702, 704, 706, 708, 710, 712. In some examples, two or more of the rib segments 702, 704, 706, 708, 710, 712 can have different designs to facilitate nesting of the rib segments 702, 704, 706, 708, 710, 712. For instance, the rib 206 can include rib segments that alternate between (a) a rib segment defined as a solid piece and (b) a rib segment having a split rib design including an opening defined in the rib segment to receive a last a portion of the solid rib.

Figure 8:
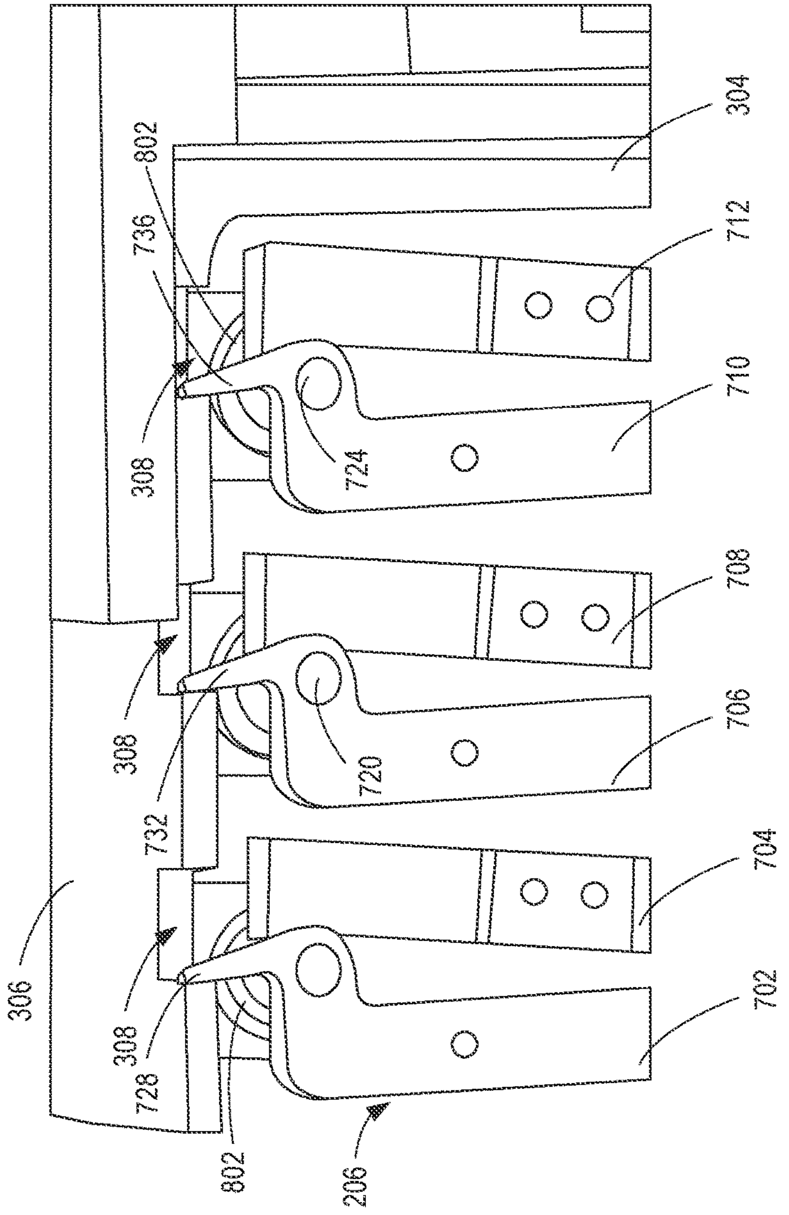
FIG. 8 illustrates a portion of the rib of FIG. 7 supported by a portion of the hub of the example antenna of FIGS. 3-6.

FIG. 8 illustrates a portion of the rib segments 702, 704, 706, 708, 710, 712 of the example rib 206 of FIG. 7 and a portion of the plate 306 of the hub 200 of FIG. 3. In particular, FIG. 8 illustrates the rib 206 carried by the hub 200 when the hub 200 is stored in the housing 102 (not shown) and the rib 206 is folded. Although the example of FIG. 8 is discussed in connection with the plate 306, the relationship between one or more of the rib segments 702, 704, 706, 708, 710, 712 and the platform 300 of the hub 200 can be substantially similar.

As shown in FIG. 8, the tang 728 of the first rib segment 702 is at least partially disposed in a first one of the slots 308 of the plate 306. The tang 732 of the third rib segment 706 and the tang 736 of the fifth rib segment 710 are at least partially disposed in other ones of the slots 308 of the plate 306. Similarly, although not shown in FIG. 8, the tang 730 of the second rib segment 704 and the tang 734 of the fourth rib segment 708 are received in corresponding slots defined in the platform 300. In some examples, the tangs 728, 730, 732, 734, 736 extend or pierce through the reflective material supported by the rib segments 702, 704, 706, 708, 710, 712 (e.g., during manufacture of the reflective portion) to enable the tangs 728, 730, 732, 734, 736 to enter the slots 308 of the plate 306 or the platform 300 without interference from the reflective material.

The first, third, and fifth joints 716, 720, 724 are shown in FIG. 8. Each of the joints 716, 720, 724 includes a rotational spring 802 (e.g., a torsion spring). When the rib 206 is in the folded position and the tangs 728, 732, 736 of a corresponding rib segment 702, 706, 710 are received in the slots 308, the rotational springs 802 are in tension and bias the tang 728, 732, 736 against a portion of the plate 306 defining the slot 308 in which the respective tang 728, 732, 736 is disposed. Similarly, the second and fourth joints 718, 722 include rotational springs 802 that are in tension to bias the tangs 730, 734 of the corresponding rib segments 704, 712 against the platform 300. Thus, the joints 716, 718, 720, 722, 724 and the tangs 728, 730, 732, 734, 736 hold the rib segments 702, 704, 706, 710, 712 in the folded configuration.

Referring to FIGS. 7 and 8, when the hub 200 is raised from the housing 102, the end 714 of the first rib segment 702 is exterior to the housing 102. When the end 714 of the first rib segment 702 is exterior to the housing 102, the tension of the rotational spring 802 of the first joint 716 is at least partially released such that the first rib segment 702 rotates about the first joint 716. The end 714 of the first rib segment 702 moves outward and away from the shaft 304 of the hub 200. Put another way, the first rib segment 702 extends radially relative to the shaft 304. When the first rib segment 702 has rotated to a particular angle relative to the shaft 304, the tang 728 of the first rib segment 702 moves out of the slot 308 of the plate 306 (e.g., overcomes the bias of the rotational spring 802). The deployment angle to cause release of the tang 728 can be, for example, a 40 degree angle between the end 714 of the rib segment 702 and the shaft 304. The release of the tang 728 of the first rib segment 702 from the slot 308 causes the first rib segment 702 to further extend radially.

The radial extension of the first rib segment 702 and the release of the tang 728 from the slot 308 also causes the second rib segment 704 to rotate about the corresponding joints 716, 718. The second rib segment 704 extends radially relative to the shaft 304. The tang 730 of the second rib segment 704 releases from the slot 308 of the platform 300 in response to the second rib segment 704 achieving a deployment angle (e.g., a 40 degree angle) relative to the shaft 304. Thus, the first and second rib segments 702, 704 are unfolded.

The radial extension of the second rib segment 704 and the release of the tang 730 of the second rib segment 704 from the corresponding slot 308 causes the third rib segment 706 to rotate about the corresponding joints 718, 720. The third rib segment 706 extends radially relative to the shaft 304 as discussed in connection with the first and second rib segments 702, 704 (e.g., via the rotational spring 802 of the third joint 720 and release of the third tang 732 from the slot 308 of the plate 306). Similarly, the fourth rib segment 708 extends radially in response to extension of the third rib segment 706 reaching the deployment angle, the fifth rib segment 710 extends radially in response to extension of the fourth rib segment 708 reaching the deployment angle, etc. until each of the rib segments 702, 704, 706, 708, 710, 712 is extended radially relative to the shaft 304. The end 714 of the rib 206 remains coupled to the hinge 400 when the rib 206 is in the unfolded position.

Thus, the ribs 206 are mechanically self-sequenced to unfold when the hub 200 is raised from the housing 102 and the end 714 of the first rib segment 702 is exterior to the housing 102. The sequenced unfolding of the rib segments 702, 704, 706, 708, 710 helps to reduce snagging or tangling of the reflective material (e.g., mesh) carried by the ribs 206. Further, the hold down release mechanism 504 (FIG. 5) serves as a single release actuator for the mast 204 and the ribs 206 by enabling the mast 204 to extend and the hub 200 to raise from the housing 102, thereby enabling the ribs 206 to self-actuate when exterior to the housing 102.

FIG. 9 illustrates the example rib 206 of FIG. 7 in the unfolded position. As disclosed in connection with FIGS. 7 and 8, each of the rib segments 702, 704, 706, 708, 710, 712 moves via the corresponding joints 716, 718, 720, 722, 724, which causes the rib segments 702, 704, 706, 708, 710, 712 to unfold. In the unfolded configuration, the rib 206 has parabolic shape or substantially parabolic shape. The sixth rib segment 712 remains coupled to the hub 200 via the hook 726. The joints 716, 718, 720, 722, 724 support curvature of the rib segments 702, 704, 706, 708, 710, 712 to define the parabolic or substantially parabolic shape of the rib 206. The number of rib segments 702, 704, 706, 708, 710, 712 and the curvature of the rib segments 702, 704, 706, 708, 710, 712 provides for adjustment of a focal point of the reflector portion of the antenna 100 (e.g., a point where the reflected waves will be concentrated) relative to a diameter of the reflector portion (e.g., fid).

FIGS. 10A-10I illustrate an example deployment sequence of the antenna 100 of FIGS. 1-9 from the housing 102. In FIG. 10A, the antenna 100 is stored in the housing 102. In FIG. 10B, the hub 200 begins to lift out of the housing 102 due to release of the hold-down release mechanism 504 (FIG. 5). As shown in FIGS. 10B and 10C, the mast 204 extends from the shaft 304 of the hub 200 (e.g., via extension of the first spring 502 of FIG. 5) and the platform 300 (not shown) is lifted from the housing 102 (e.g., via extension of the second spring 514 of FIG. 5).

When the ends 714 (FIG. 7) of the respective first segments 702 of the ribs 206 are exterior to the housing 102, the rib segments 702, 704, 706, 708, 710, 712 (FIG. 7) of the respective ribs 206 begin to unfold as disclosed in connection with FIGS. 7-9 (e.g., via release from the slots 308 of the plate 306 and the platform 300 of FIG. 3). FIGS. 10D-10I illustrate the unfolding of the respective ribs 206 via radial extension of the rib segments 702, 704, 706, 708, 710, 712. For illustrative purposes, some of the rib segments 702, 704, 706, 708, 710, 712 are identified in FIGS. 10D-10G. Also, for illustrative purposes, the reflective material supported by the ribs 206 is not shown in FIGS. 10B-10I.

In FIG. 10I, the antenna 100 is in the deployed configuration. As shown in FIG. 10I, each of the ribs 206 is extended to the substantially parabolic shape while supported by the shaft 304 of the hub 200. Also, the mast 204 is extended to raise the feed 108 relative to the housing 102.

Figure 11:
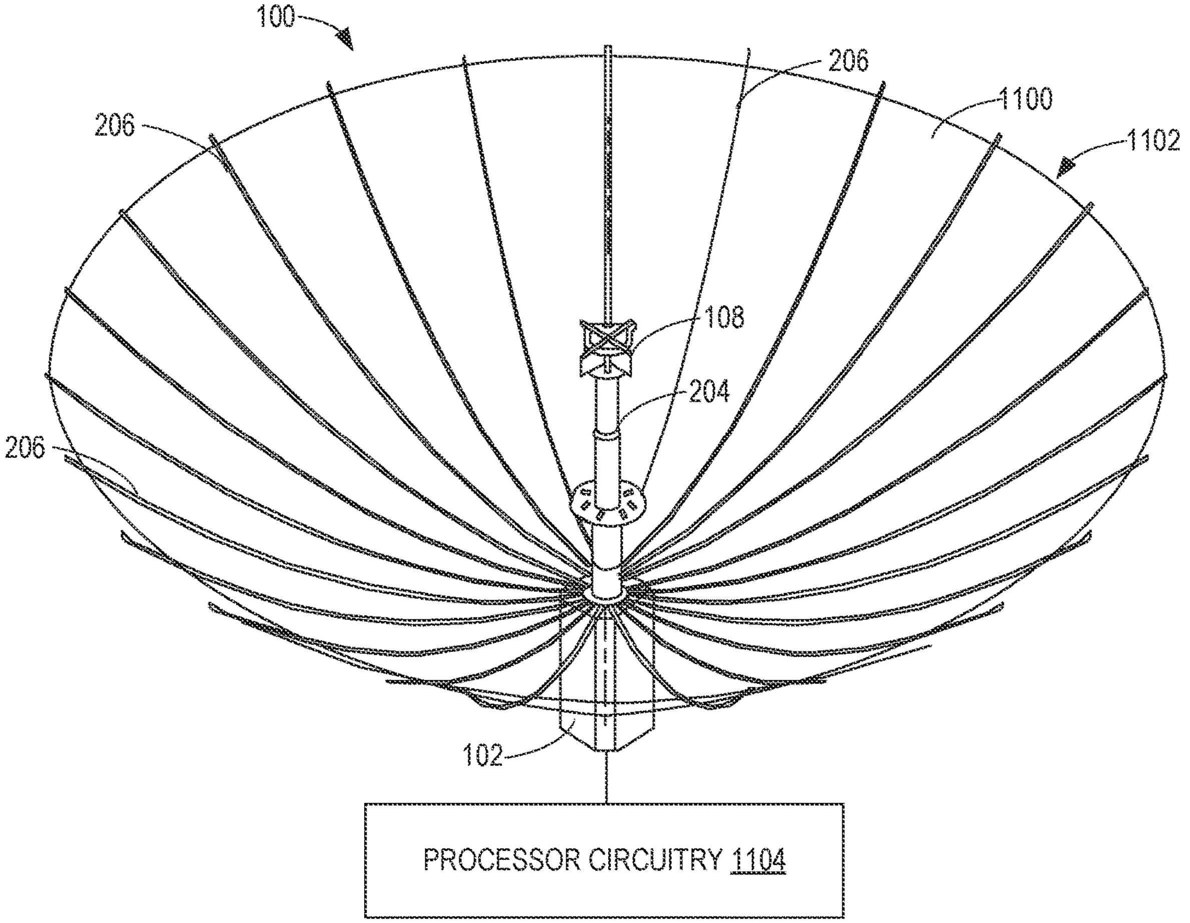
FIG. 11 illustrates the example antenna of FIGS. 1-10I in a deployed configuration.

FIG. 11 is a top view of the example antenna 100 in the deployed configuration. In particular, FIG. 11 illustrates a reflective material 1100 supported by the ribs 206. As the ribs 206 expand, the ribs 206 pull or extend the reflective material 1100 to expand and form a parabola or a substantially parabolic shape. The unfolded ribs 206 and the expanded reflective material 1100 define a reflector portion 1102 of the antenna 100. In the deployed configuration, the reflector portion 1102 can be exposed on an outside face of, for instance, a satellite.

The reflective material 1100 reflects radio frequency waves. The feed 108 transmits and receives the radio frequency waves. The mast 204 can be aligned with a parabola focal point of the reflector portion 1102 of the antenna 100 such that when the mast 204 is extended as shown in FIG. 11, the feed 108 is located at the focus of the parabola defined by the reflector portion 1102.

The antenna 100 is communicatively coupled to, for example, processor circuitry 1104 of a satellite that includes the antenna 100. The processor circuitry 1104 can receive signals from the feed 108 and cause signals to be transmitted via the feed 108. The processor circuitry 1104 can also generate and output instructions with respect to deployment of the antenna 100, such as instructions to actuate the hold down actuator release mechanism 504 to cause the mast 204 and the ribs 206 to move exterior to the housing 102. The antenna 100 can include additional circuitry (e.g., transmit/receive circuitry) to facilitate communication between the antenna 100 and the processor circuitry 1104.

The reflector portion 1102 of the antenna 100 can have a diameter of, for example 1.4 meters. A shape or a size of the reflector portion 1102 of the antenna 100 can differ from the example shown in FIG. 11. In some examples, during manufacture of the reflector portion 1102 of the antenna 100, a mandrel having the same or substantially same parabola shape that is to be defined by the reflective material 1100 is used as a holding fixture. In particular, the mandrel allows the ribs 206 to be arranged and permits access from beneath and above the ribs 206 to enable stitching of the reflective material 1100 to the rib segments (e.g., the rib segments 702, 704, 706, 708, 710, 712). In some examples, the mesh can be coupled to the rib segments using adhesives (e.g., Kapton© tape).

Figure 12:
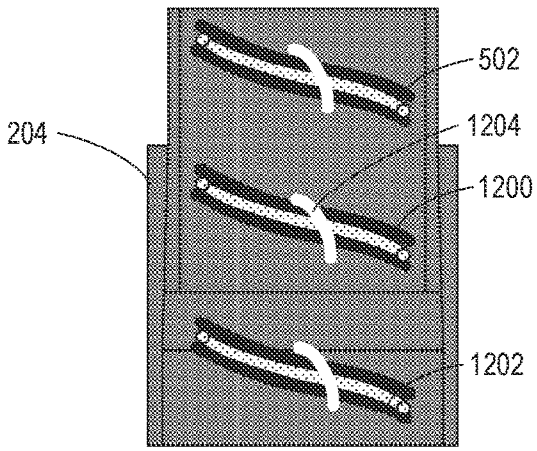
FIG. 12 is a cross-sectional view of a portion of the mast of the example antenna of FIGS. 1-11 taken long the 12-12 line of FIG. 6 and including cables extending therein to facilitate communication between the antenna and processor circuitry.

FIG. 12 is a partial sectional view of the mast 204 of FIG. 11 taken along the 12-12 line of FIG. 6. In particular, FIG. 12 illustrates a portion of the first spring 502 in the mast 204. One or more cables (e.g., radio frequency cables) extend from the feed 108 to, for example, the processor circuitry 1104 (FIG. 11) via the mast 204. In the example of FIG. 12, a first cable 1200 and a second cable 1202 extend through the mast 204. To reduce interference of the cables 1200, 1202 with first spring 502 and/or other components of the hub 200, the cables 1200, 1202 are affixed to the first spring 502 via lacing 1204. Thus, first spring 502 carries the cables 1200, 1202. The winding of the cables 1200, 1202 about the first spring 502 reduces tangling or interference by the cables 1200, 1202 with, for example, extension of the first spring 502 when the hold-down release mechanism 504 is activated. Thus, the cables 1200, 1202 are integrated in the mast 204 to facilitate communication from the feed 108 while reducing interference with other components of the antenna 100.

Figure 13:
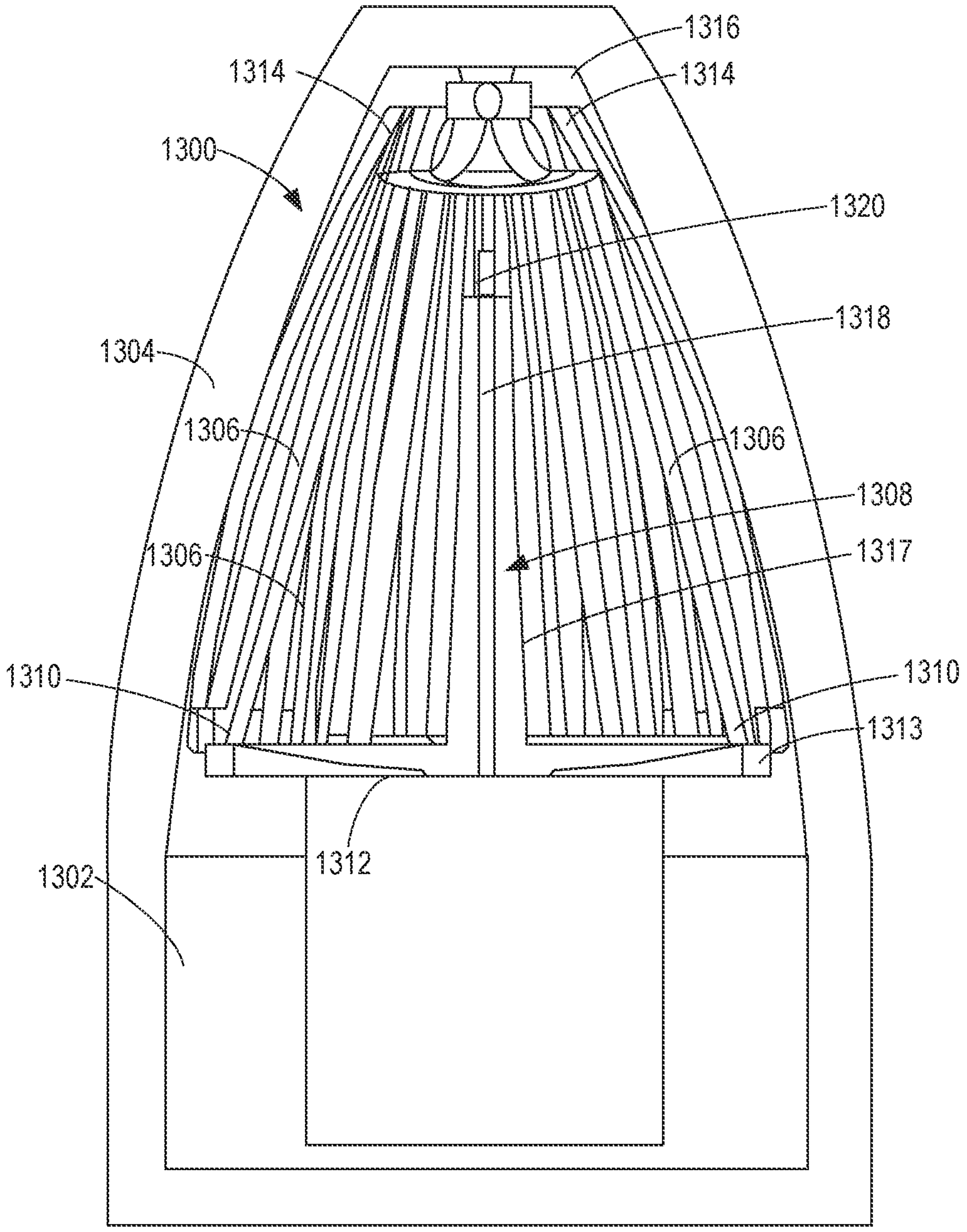
FIG. 13 illustrates a second example reflector antenna in a stowed configuration in accordance with teachings of this disclosure.

FIG. 13 illustrates a second example reflector antenna 1300 in accordance with teachings of this disclosure. The antenna 1300 is carried by a portion 1302 of a satellite. In the example of FIG. 13, the antenna 1300 is in a stowed configuration. For illustrative purposes, the example antenna 1300 is shown in a payload fairing 1304 that protects the antenna 1300 from forces experienced during, for instance, launch of the satellite. When the payload fairing 1304 is removed, the antenna 1300 is otherwise substantially exposed in the stowed configuration during orbit of the satellite.

Figure 14:
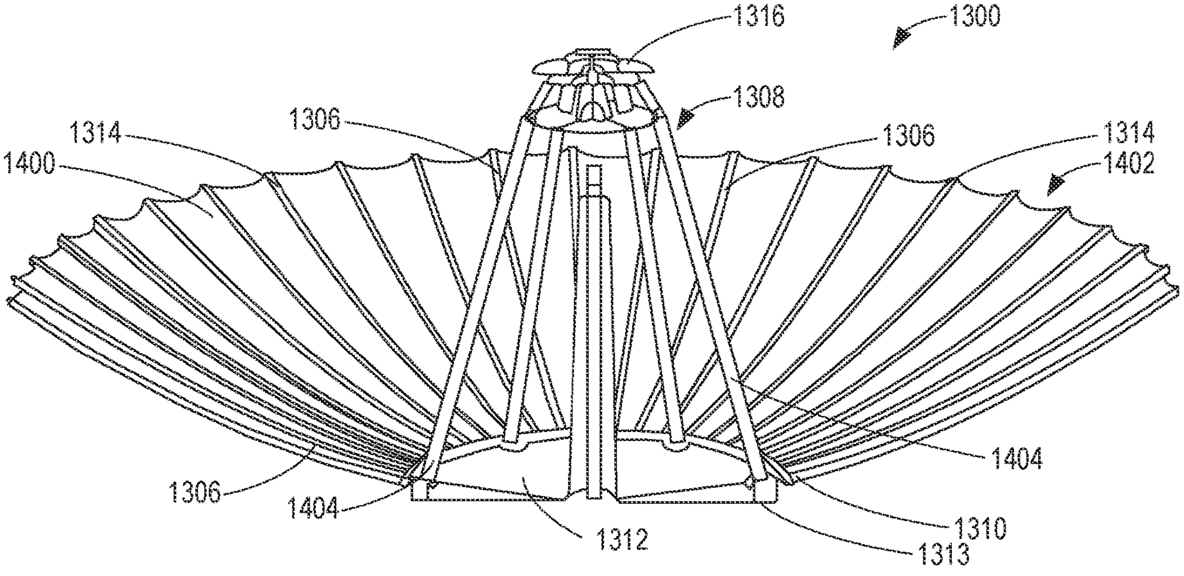
FIG. 14 illustrates the example antenna of FIG. 13 in a deployed configuration.

The example antenna 1300 of FIG. 13 includes a plurality of ribs 1306. The ribs 1306 support a reflective material (FIG. 14). The ribs 1306 can be defined by a single segment or can include two or more segments coupled via joints (e.g., as disclosed or substantially as disclosed in connection with the example antenna 100 of FIGS. 1-12). The number of segments can be selected to define a size of the reflector portion of the antenna. The example antenna 1300 of FIG. 13 includes thirty ribs 1306. However, the antenna 1300 can include additional or fewer ribs 1306 based on, for example, a surface accuracy of the antenna 1300 to be achieved with respect to holding the reflective material in tension via the ribs 1306.

The ribs 1306 are supported by a hub 1308 of the example antenna 1300. In the example of FIG. 13, the ribs 1306 substantially surround the hub 1308. For illustrative purposes, some of the ribs 1306 are not shown in FIG. 13 to show a portion of the hub 1308. A first end 1310 of the respective ribs 1306 is pivotably coupled to a base 1312 of the hub 1308. A second end 1314 of the respective ribs 1306 is coupled to a cap 1316 of the hub 1308 when the antenna 1300 is in the stowed configuration. A mast 1317 extends from the base 1312 of the hub 1308. The mast 1317 can be defined by a carbon fiber material. A waveguide 1318 is at least partially disposed in the shaft 1317. The waveguide 1318 supports an X-band horn antenna 1320. The mast 1317 supports the waveguide 1318 and the X-band horn antenna 1320.

As disclosed herein, when the antenna 1300 moves to the deployed configuration (FIG. 14), the ribs 1306 uncouple from the cap 1316 and pivot about a rim 1313 of the base 1312 to move from a folded position as shown in FIG. 13 to an unfolded position. In particular, the cap 1316 includes a hold down release mechanism (FIG. 15) that, when activated, causes at least a portion of the cap 1316 to lift, thereby releasing the ribs 1306 coupled thereto. When the ribs 1306 are released from the cap 1316, the ribs 1306 pivot about the base 1312 to the unfolded position.

FIG. 14 illustrates a partial view of the example antenna 1300 in the deployed configuration. For illustrative purposes, some of the ribs 1306 are not shown in FIG. 14. As shown in FIG. 14, the ribs 1306 are unfolded relative to the position of the ribs 1306 shown in FIG. 13. In particular, the ends 1314 of the ribs 1306 are uncoupled from the cap 1316, thereby enabling the ribs 1306 to pivot about the base 1312 of the hub 1308 such that ends 1314 of ribs 1306 move outward relative to the cap 1316. The ribs 1306 support a reflective material 1400 (e.g., a mesh). The unfolded ribs 1306 and the expanded reflective material 1400 define a reflector portion 1402 of the antenna 1300 substantially as disclosed in connection with the antenna 100 of FIG. 11.

The reflector portion 1402 of the antenna 1300 can have a diameter of, for example, three meters when in the deployed configuration. As discussed in connection with FIG. 13, the antenna 1300 can be sized to fit within a volume of the payload fairing 1304. The number of joints in the respective ribs 1306 and/or the curvature per rib (or rib segment) can be selected to achieve a particular diameter of the reflector portion 1402 of the antenna 1300 when deployed and selection of the focal point over the diameter (e.g., f/d) to define the parabolic reflector shape of the deployed antenna 1300.

As shown in FIG. 14, the hub 1308 includes stays 1404 extending between the base 1312 and the cap 1316. The example hub 1308 (e.g., the base 1312, the cap 1316, the stays 1404) and the ribs 1306 can be formed from a carbon fiber material (e.g., carbon fiber honeycomb panels). The use of carbon fiber provides for a lighter weight antenna 1300 as compared to use of other materials for the antenna components while also providing for electrical conductivity. The antenna 1300 can have a weight of, for instance 50 kilograms of less.

The example antenna 1300 provides for surface accuracy and electrical continuity between the reflective material 1400 and the hub 1308. For example, edge(s) of the reflective material 1400 can be bonded with conductive epoxy to the rim 1313 of the hub 1308, where the conductive epoxy has a thickness that provides for continuity or substantial continuity between the reflective material 1400 and the hub 1308.

Figure 15:
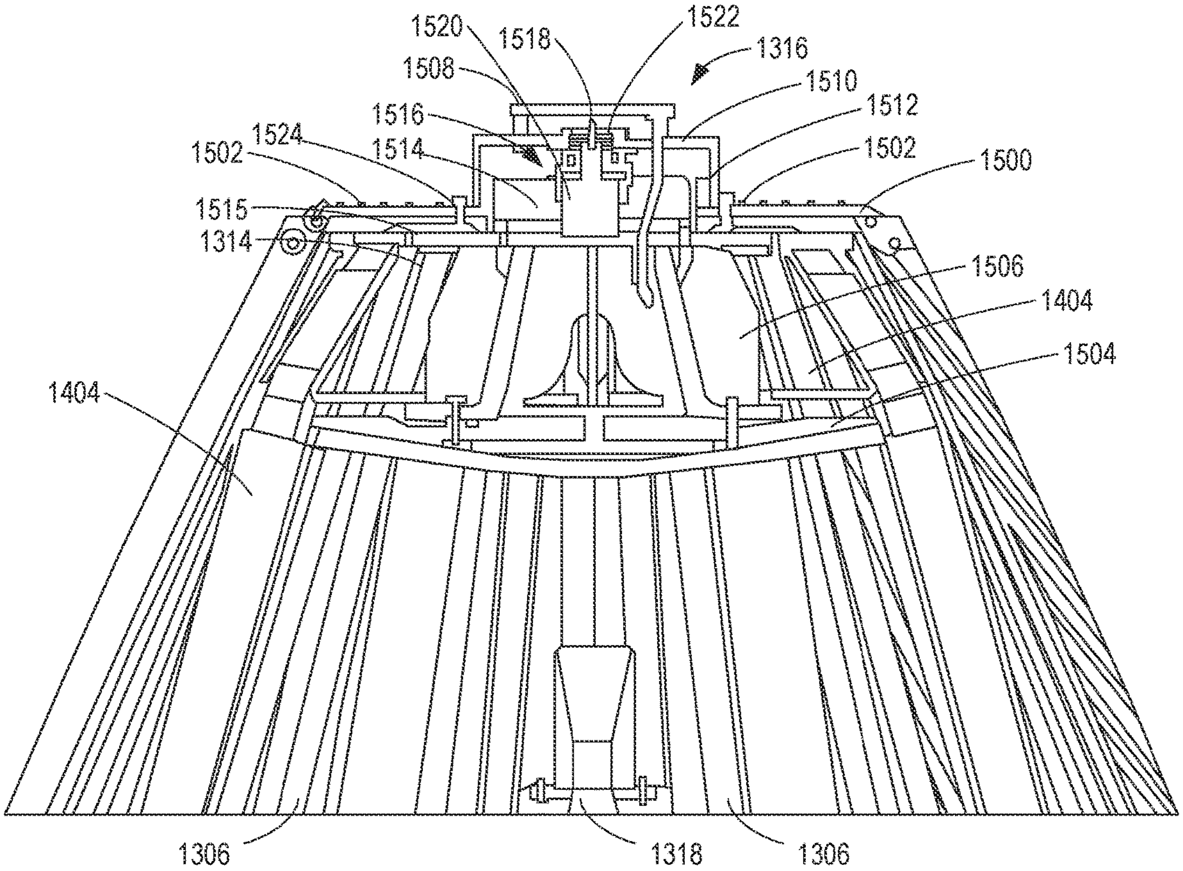
FIG. 15 illustrates a portion of a hub of the example antenna of FIGS. 13 and 14.

FIG. 15 is a sectional view of the cap 1316 of the example hub 1308 of FIGS. 13 and 14. In the example of FIG. 15, the ribs 1306 are in the folded position. The ribs 1306 are coupled to a portion of the cap 1316 via pins 1502 that extend through a first surface 1500 of the cap 1316. The pins 1502 are coupled to (e.g., affixed to) the ends 1314 of the ribs 1306. For illustrative purposes, the reflective material 1400 is not show in FIG. 16

The example cap 1316 of FIG. 15 supports one or more electronic components of the antenna 1300. For example, the cap 1316 includes a dichroic surface 1504, or a surface that acts as a sub-reflector to high frequencies while passing lower frequencies. The dichroic surface 1504 can enable bandwidth coverage from 300 MHz-6 GHz and 8-10 GHz. The example cap 1316 of FIG. 15 also supports an antenna feed 1506 (e.g., an ultra-wide band feed). A TTC (tracking, telemetry, command) patch antenna 1508 is supported by a second surface 1510 of the cap 1316. The location of the TTC patch antenna 1508 (i.e., on the surface 1510) prevents interference from the reflector portion 1402 (FIG. 14) of the antenna 1300 with the TTC patch antenna 1508 that might otherwise occur if the TTC patch antenna 1508 were mounted elsewhere relative to the antenna 1300. Also, the location of the TTC patch antenna 1508 permits access to the TTC patch antenna 1508 when the antenna 1300 is in the stowed configuration. Thus, the example antenna 1300 supports multi-feed antennas that provide for wideband operations and single band high frequency operation. Further, in the example antenna 1300 of FIG. 13, the TTC patch antenna 1508 is in a location that is unblocked when the antenna 1300 is in either the stowed configuration or the deployed configuration, thereby enabling the antenna 1300 to support multiple TTC frequencies.

The second surface 1510 of the cap 1316 defines a portion of a first housing 1512 of the cap 1316. The first housing 1512 is carried by the first surface 1500 (i.e., the surface that receives the pins 1502). The cap 1316 includes a second housing 1514. The second housing 1514 is carried by a third surface 1515 of the cap 1316. The third surface 1515 is supported by two or more of the stays 1404.

In the example of FIG. 15, the first housing 1512 and the second housing 1514 are coupled via an actuator or hold down release mechanism 1516. The hold down release mechanism 1516 includes a fastener 1518 (e.g., a bolt) coupled to a support 1520. The support 1520 extends from the second housing 1514 to the first housing 1512. The fastener 1518 protrudes from the support 1520 and extends through the second surface 1510. A spring 1522 extends about a portion of the support 1520 in the first housing 1512. When the fastener 1518 extends through the second surface 1510, the spring 1522 is compressed due to the coupling between the hold down release mechanism 1516 and the first housing 1512.

In the example of FIG. 15, the hold down release mechanism 1516 is a pin puller release mechanism (e.g., a TiNi® pin puller). When the hold down release mechanism 1516 is activated, the fastener 1518 retracts into the support 1520 and, thus, the fastener 1518 no longer extends through the second surface 1510. As a result, the spring 1522 is no longer held in compression and expands. The expansion of the spring 1522 causes the first housing 1512 and the first surface 1500 to lift away from the third surface 1515 that supports the second housing 1514. Put another way, a portion of cap 1316 lifts or moves away from the base 1312. In some examples, the first surface 1500 moves along guides 1524 that extend between the first surface 1500 and the third surface 1515. As a result of movement of the first housing 1512 and the first surface 1500 away from the third surface 1515, the first surface 1500 raises above the pins 1502 coupled to the rib ends 1314, thereby releasing the ribs 1306 and permitting the ribs 1306 to move (e.g., swing) outward. For instance, the pins 1502 can be made of aluminum and coupled to the rib ends 1314. The first surface 1500 can include, for example, a G10 fiberglass or similar material. The first surface 1500 slides relative to (e.g., moves up away from) the aluminum pins 1500 and releases the ribs 1306 when the pins 1502 clear the rising first surface 1500. In other examples, the pins 1502 may uncouple from the ends 1314 of the ribs 1306 when the first surface 1500 rises. Put another way, the movement of the first surface 1500 can pull the pins 1502 from the ends 1314 of the ribs 1306, such that the ribs 1306 are released from the pins 1502. In such examples, the pins 1502 can remain coupled to first surface 1500.

When released, the ribs 1306 pivot outward about rim 1313 of the hub 1308 to the unfolded position shown in FIG. 14. Each of the ribs 1306 pivots outward at the same or substantially same time in response to being uncoupled from the first surface 1500. In the example of FIG. 15, the antenna 1300 can be moved from the deployed configuration to the stowed configuration (e.g., upon return of a satellite to Earth) by refolding the ribs 1306 and re-setting the pins 1502 and the hold down release mechanism 1516 (e.g., using a tool designed for the pin puller) such that the fastener 1518 extends through the second surface 1510 to compress the spring 1522. Although the example hold down release mechanism 1516 of FIG. 15 is a pin puller release mechanism, other types of hold down release mechanisms can be used (e.g., hold down release mechanisms having frangible portions).

Figure 16:
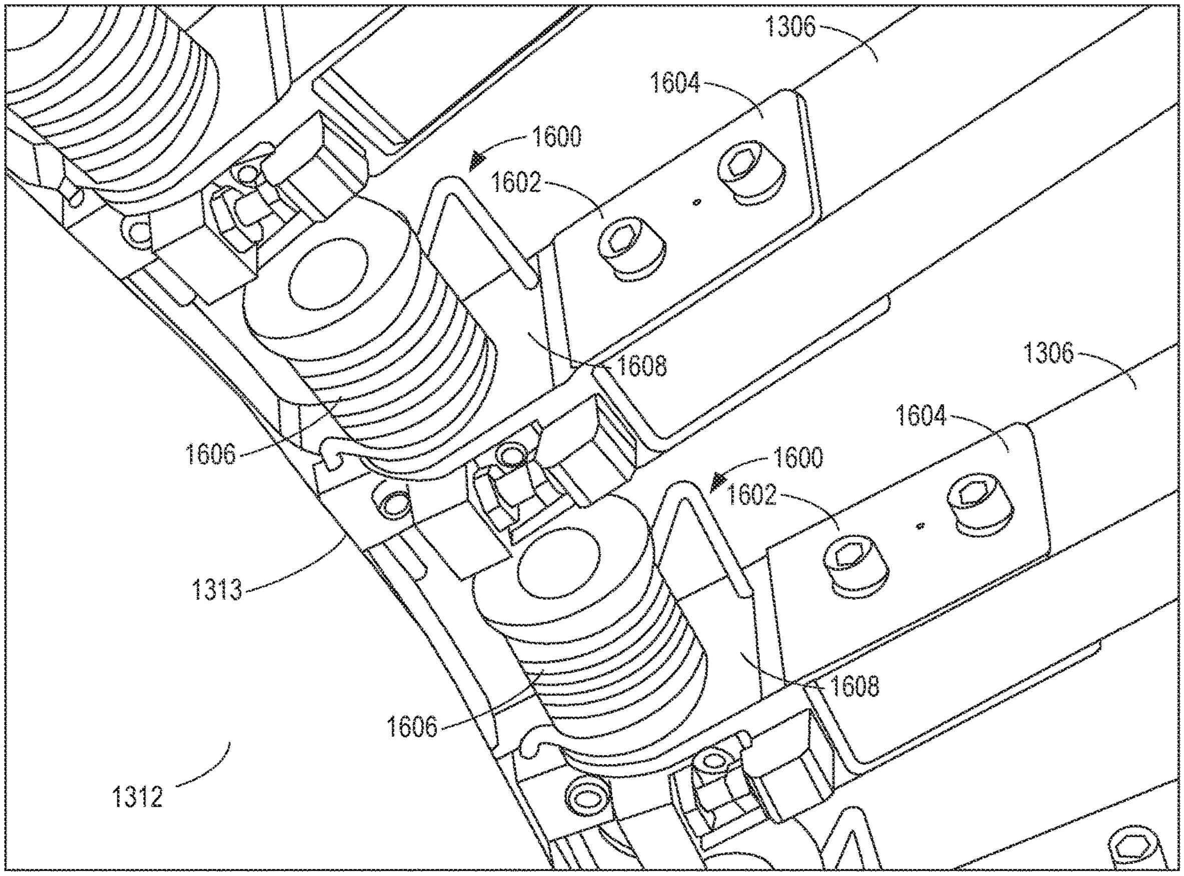
FIG. 16 illustrates another portion of the example hub of FIG. 15.

FIG. 16 illustrates a portion of the rim 1313 of the base 1312 of the hub 1308 of FIG. 13 and, in particular, shows hinges 1600 about which the ribs 1306 pivot when moving to the unfolded position. For illustrative purposes, the reflective material 1400 is not shown in FIG. 16.

As shown in FIG. 16, each hinge 1600 includes a housing 1602. A portion of a respective rib 1306 is coupled via mechanical fastener(s) to a first end 1604 of the housing 1602. A rotational spring 1606 (e.g., a torsion spring) is coupled to a second end 1608 of each housing 1602. The rotational springs 1606 enable the ribs 1306 to rotate using stored potential energy when the ribs 1306 are released from the first surface 1500 response to activation of the hold down release mechanism 1516. Dampers can be used to control a rate at which the ribs 1306 rotate during unfolding. Each hinge 1600 includes a mechanical stop such that the ribs 1306 stop rotating when the rib 1306 reaches the stop. The stops can be tuned to define a curvature of the reflector portion 1402 when the ribs 1306 are unfolded.

The antenna 1300 of FIGS. 13-16 can be in communication with processor circuitry (e.g., the processor circuitry 1104 of FIG. 11). The processor circuitry can generate and output instructions with respect to deployment of the antenna 1300, such as instructions to actuate the hold down actuator release mechanism 1516. The processor circuitry can send and/or receive signals from the antenna feed 1506, the X-band horn antenna 1320, etc. of the example antenna 1300.

Figure 17:
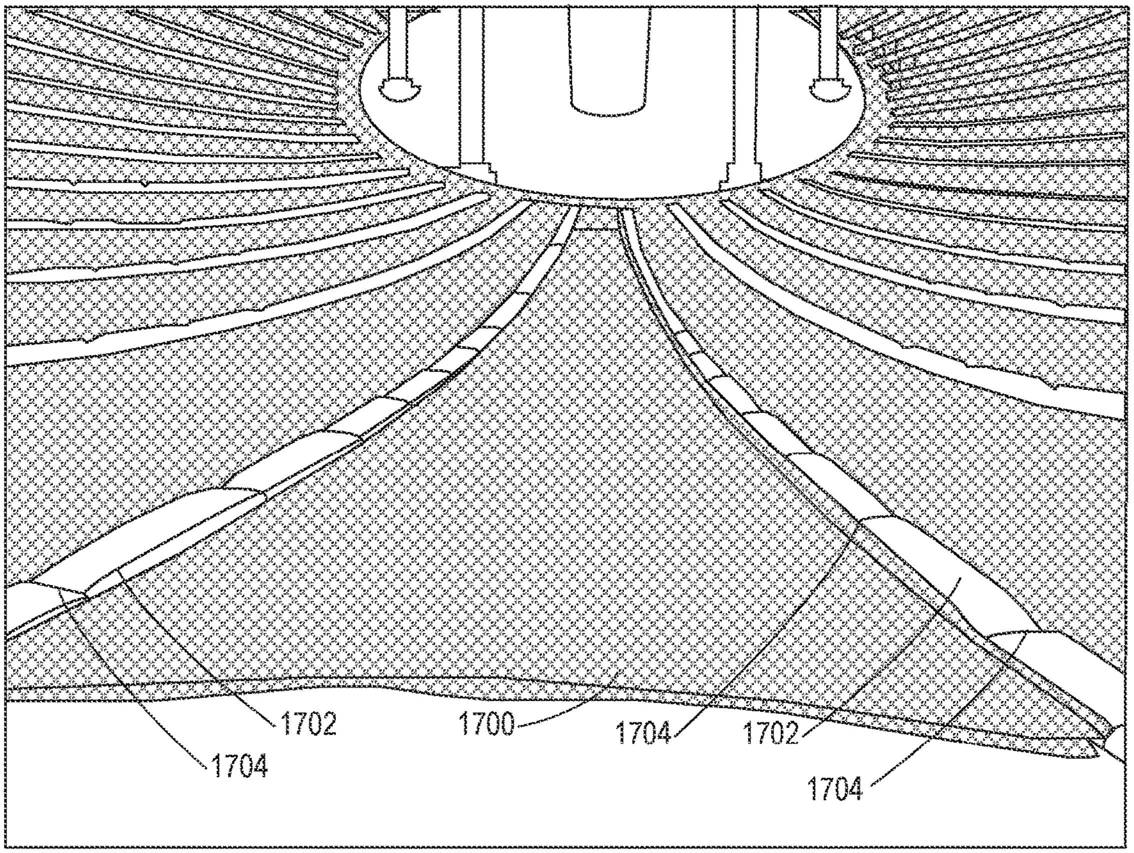
FIG. 17 illustrates an example reflective material that may be used in connection with the example antenna disclosed herein in accordance with teachings of this disclosure.

FIG. 17 illustrates an example reflective material 1700 coupled to ribs of an antenna, such as the ribs 206 of the example antenna 100 of FIGS. 1-12 and/or the ribs 1306 of the example antenna 1300 of FIGS. 13-16. The reflective material 1700 can correspond to the reflective material 1100 of the example antenna 100 of FIGS. 1-12 and/or the reflective material 1400 of the example antenna 1300 of FIGS. 13-16.

The reflective material 1700 of FIG. 17 is a mesh. In particular, in this example, the reflective material 1700 is a gold wire mesh. The use of gold wire for the mesh 1700 can enable the use of, for example, near field scanning to evaluate performance of the mesh 1700 during manufacture process. Also, a return loss measurement of the mesh can be evaluated in an anechoic (echo-free) radio frequency environment. Other types of material, such as stainless steel, can alternatively be used to form the reflective material 1700.

The example gold wire mesh 1700 of FIG. 17 can be formed using weft knitting (e.g., circular weft knitting) in which a single thread is used to product a continuous tube of fabric (e.g., a gore) defining the mesh. The metal wire can be annealed to enable the weft knitting manufacture process. The weft knitting process provides for a mesh in which a majority of edges of the mesh are substantially finished (e.g., edges defined by loops as a result of the weft knitting process) as compared to, for instance, warp knitting. In warp knitting, individual threads are used. Also, in warp knitting, the material is cut to define the edges, which can result in untrimmed or loose material at the edges due to the use of individual threads. In weft knitting, one of the edges of the fabric gore may be cut, however, the other edges are substantially finished or defined by the loops formed during the knitting process. A size of the distance between the loops forming the mesh using the weft knitting process can be varied for different meshes. A fill area (percent of open area to wire crossings) or openings per inch of the mesh can be selected to define a maximum frequency of operation.

In the example of FIG. 17, the reflective material or mesh 1700 is coupled to the ribs of the antenna (e.g., the antenna 100, 1300) via one or more fasteners. In the example of FIG. 17, the fasteners include a hook and loop material (e.g., Velcro©), a portion 1702 of which is shown in FIG. 17 (e.g., the loop portion). As disclosed in connection with FIG. 18, a portion of the mesh 1700 extending over a respective rib is sandwiched between the hook and loop material 1702. Other types of material, such as adhesive tape (e.g., Kapton© tape) could be used to couple the mesh 1700 to the ribs. Also, in the example of FIG. 17, clips 1704 provide for redundancy in coupling the hook and loop material 1702 to the rib. The clips 1704 (e.g., C-clips) can be made of spring wire. In the example of FIG. 17, the clips 1704 are gold-plated. Additional or fewer clips 1704 than shown in FIG. 17 can be used.

Figure 18:
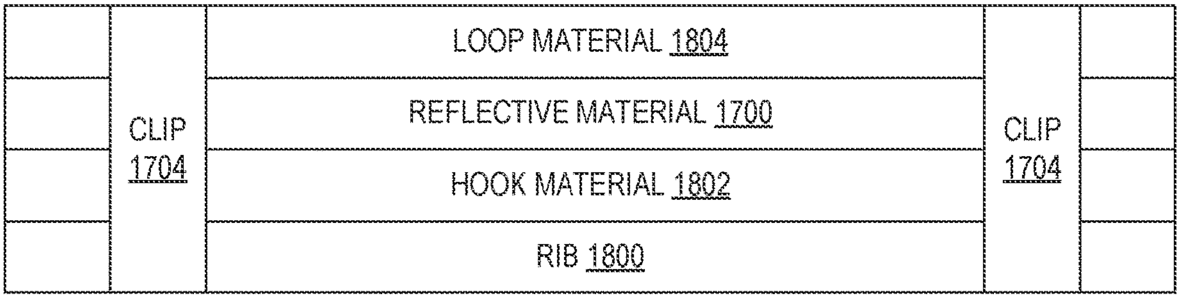
FIG. 18 is a schematic illustration of a coupling of the reflective material of FIG. 17 to ribs of an antenna in accordance with teachings of this disclosure.

FIG. 18 is schematic illustration of an example arrangement for coupling (e.g., attaching, securing) the reflective material 1700 (e.g., the reflective material 1100, the reflective material 1400) to a rib 1800 (e.g., the rib 206, the rib 1306) of an antenna (e.g., the antenna 100, the antenna 1300). When the reflective material 1700 is supported by the ribs 1800 of the antenna, the reflective material 1700 is expanded and held in tension by the ribs 1800 when the ribs move from the folded position to the unfolded position (e.g., as shown in FIGS. 11, 14). In FIG. 18, a portion of a rib 1800 is represented. Although FIG. 18 is discussed in connection with one of the ribs 1800, it should be understood that the reflective material 1700 can be coupled to the other ribs 1800 of the antenna in the same or substantially the same manner.

A hook material 1802 is coupled to (e.g., adhered to) a surface of the rib 1800 (e.g., along a length of the rib 1800 or a portion thereof). The hook material 1802 can be chemically coupled to the rib 1800 using, for instance, an adhesive (e.g., a glue). The reflective material 1700 is laid over the hook material 1802. A loop material 1804 is laid over the reflective material 1700. The loop material 1804 engages the hook material 1802 via openings in the reflective material or mesh 1700.

When the ribs 1800 are in the unfolded configuration (i.e., the antenna is in the deployed configuration as shown in FIGS. 11 and 14), the loop material 1804 defines a portion of an interior or reflecting surface the reflector portion of the antenna (e.g., the surface of the reflector portion 1102, 1402 facing the antenna feed 108, 1506). The portion of the reflective material 1700 extending over the ribs 1800 is sandwiched between the hook material 1802 and the loop material 1804. However, the radio frequency energy can pass through the hook and loop materials 1802, 1804. Thus, the materials 1802, 1804 do not interfere with performance of the antenna.

The hook and loop materials 1802, 1804 are flexible materials that follow, for instance, contours of the rib 1800 when the rib 1800 is curved to define the parabolic shape of the reflector portion of the antenna. The hook material 1802 and the loop material 1804 can be selected for properties the permit the materials 1802, 1804 to withstand, for instance, temperatures, atomic oxygen, and/or radiation effects of a space environment. However, although the materials 1802, 1804 can withstand effects of orbit, such materials 1802, 1804 may nonetheless deteriorate or disintegrate over time. Further, the non-conductive materials 1802, 1804 may contribute to spacing charging of the reflective material 1700 (e.g., collection of electric charges). As disclosed herein, the clips 1704 of FIG. 17 provide for redundancy in coupling the reflective material 1700 to the ribs 1800 of the antenna to maintain coupling of the reflective material 1700 to the rib 1800 despite any degradation or disintegration of the hook and loop materials 1802, 1804 over time. Also, the clips 1704 mitigate the effects of space charging.

The clips 1704 (e.g., C-clips) extend over the loop material 1804 (e.g., as shown in FIG. 17) and ends of the respective clips 1704 engage with the rib 1800. The clips 1704 facilitate engagement between the hook and loop materials 1802, 1804 to hold the reflective material 1700, which can increase surface accuracy of the reflective material 1700 supported by the ribs 1800 (e.g., tension of the reflective material 1700 extending between the ribs 1800). Although the example of FIG. 18 shows two clips 1704, additional or fewer clips 1704 can be used along the length of rib 1800 or portions thereof. Also, a spacing between the clips 1704 can differ from the examples shown in in FIGS. 17 and 18.

The gold-plated clips 1704 also match the gold-plated mesh 1700 and, thus, the interface (e.g., direct contact) between the mesh 1700 and the clips 1704 is defined by the same material type (e.g., gold plating to gold plating). Passive intermodulation (e.g., signal distortion) can result from dis-similar metal contacts on a reflecting side of the antenna (e.g., the side or surface of the reflector portion 1102, 1402, facing the antenna feed 108, 1506). Thus, effects of passive intermodulation are minimized due to the similar metal interface between the clips 1704 and the reflective material 1700. Rather, dis-similarities in material interfaces (e.g., an interface between the ribs 1800 and clips 1704) are substantially limited to a backside of the antenna (e.g., an outward facing or exterior surface of the reflector portion 1102, 1402). As result, the clips 1704 can be used to provide for surface accuracy by holding or assisting with holding the reflective material 1700 in tension without negatively affecting performance of the antenna due to passive intermodulation.

As disclosed in connection with FIG. 17, the clips 1704 are gold-plated and thus, are conductive. The conductive clips 1704 provide a continuous space charge discharge path to ground via the ribs 1800, which are also conductive. Thus, gold-plated clips 1704 mitigate the effects of space charging.

The gold-plated clips 1704 are corrosion resistant and, thus, can be used to secure the reflective material 1700 to the ribs 1800 even if the hook material 1802 and/or the loop material 1804 degrade or disintegrate over time. Further, the corrosion resistant clips 1704 reduces the effects of corrosion on the reflecting or operating side of the antenna. Thus, the gold-plated clips 1704 increase conductivity of the antenna, reduce effects of passive intermodulation, and provide for redundancy in coupling the reflective material 1700 to the rib 1800 by withstanding effects of the space environment over time.

Figure 19:
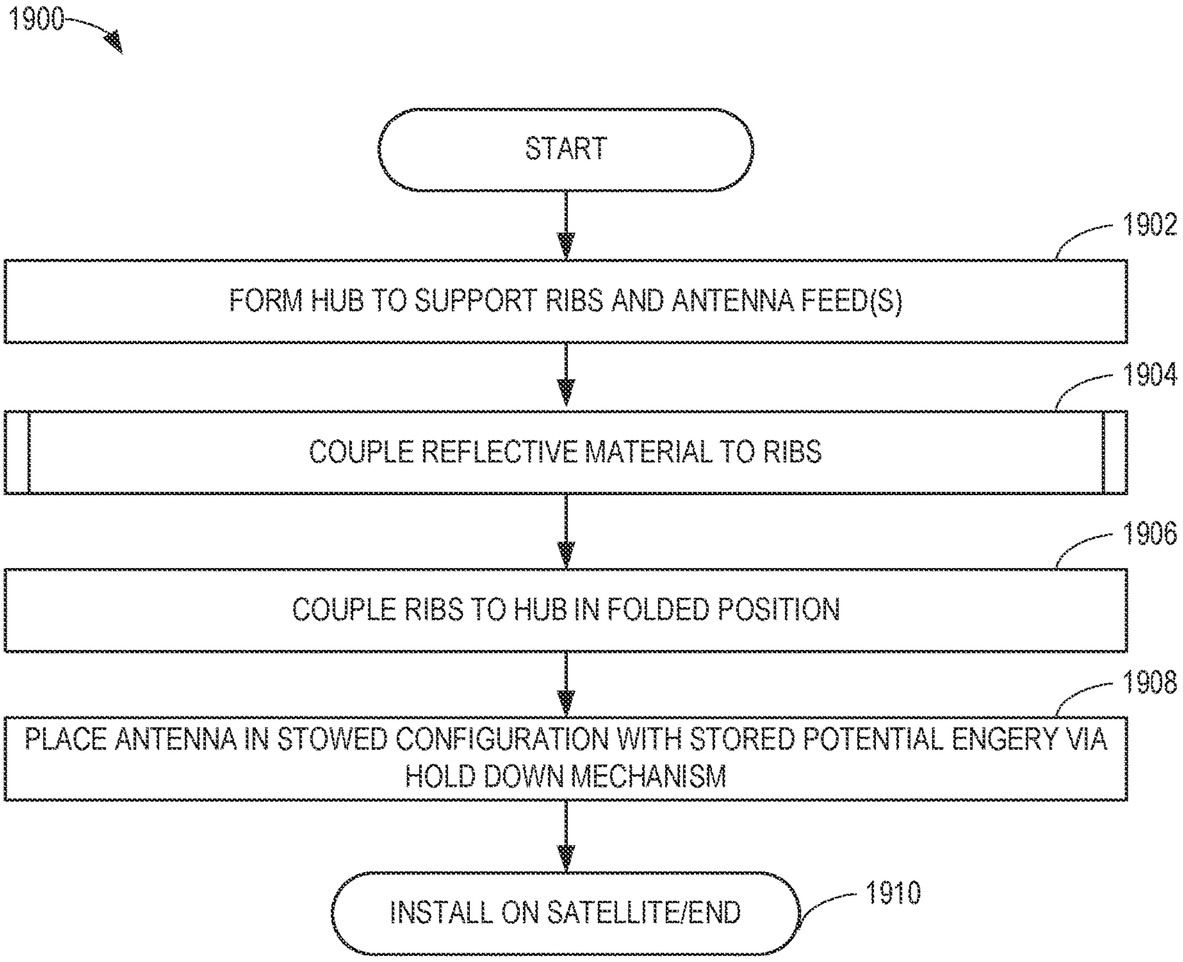
FIG. 19 is a flowchart of an example method to assemble the example antenna of FIGS. 1-12 and/or the example antenna of FIGS. 13-16 in accordance with teachings of this disclosure.

FIG. 19 is a flowchart of an example method 1900 for assembling an antenna such as the example antenna 100 of FIGS. 1-12 and/or the example antenna 1300 of FIGS. 13-16. At block 1902, the example method 1900 includes forming a hub to support ribs and feed(s) of the antenna. For example, the hub 200 of the example antenna 100 of FIGS. 1-12 can be formed to include the platform 300 and the plate 306 with the shaft 304 extending therebetween. The platform 300 and the plate 306 include apertures or slots 308 defined in the respective surfaces. The antenna feed 108 is supported by the mast 204 of the antenna 100 and the mast 204 is disposed in the shaft 304 of the hub 200. As another example, the hub 1308 of the example antenna 1300 of FIGS. 13-16 can be defined by the base 1312, the cap 1316, and the stays 1404 extending therebetween. The cap 1316 can support the antenna feed 1506 as well as other electronic components such as the TTC patch antenna 1508.

At block 1904, the example method 1900 includes coupling a reflective material to ribs of the antenna. For example, the reflective material 1100, 1400, 1700 can be coupled to the ribs 206, 1306, 1800 as further disclosed in connection with the method of FIG. 20.

At block 1906, the example method 1900 includes coupling ribs to the hub in a folded position. For example, the ribs 206 are coupled to the hub 200 of the example antenna 100 of FIGS. 1-12 such that the tangs 728, 730, 732, 734, 736 of ribs 206 are at least partially disposed in the slots 308 of the plate 306 and the platform 300 of the hub 200. The ribs 206 are in the Z-fold configuration as disclosed in connection with FIG. 7. As disclosed herein, the fold configuration of the ribs 206 and intercoupling of the rib segments 702, 704, 706, 708, 710 enables self-sequencing of the unfolding of the rib segments 702, 704, 706, 708, 710 via movement of the tangs 728, 730, 732, 734, 736 from the slots 308 of the hub 200.

With respect to the example antenna 1300 of FIGS. 13-16, ends of the ribs 1306 are pivotably coupled to the rim 1313 of the base 1312 of the hub 1308 via the hinges 1600. Opposing ends of the ribs 1306 are coupled to the pins 1502 extending through the cap 1316. In some examples, after coupling the ribs 1306 to the base 1312 via the hinges 1600, a line (e.g., string) can be coupled to the opposing end of the ribs 1306. The line can be pulled through a tube that is co-boresighted with a center point of the parabolic shaped defined by the unfolded ribs 1306. When the line is pulled through the tube, all of the ribs 1306 can be moved from the unfolded position to the folded position at the same or substantially the same time. The opposing ends of the ribs 1306 can then be coupled to the cap 1316 via the pins 1502.

At block 1908, the example method 1900 includes placing the antenna in a stowed configuration with a stored potential energy via a hold down release mechanism. For example, the example antenna 100 of FIGS. 1-12 is placed in the housing 102 with the hold down release mechanism 504 securing the mast 204 and platform 300 in the housing 102 such that the springs 502, 514 are compressed. As another example, the antenna 1300 is placed in the stowed configuration with the hold down release mechanism 1516 causing the spring 1522 in the cap 1316 to be compressed, thereby maintaining coupling between the pins 1502, the ribs 1306, and the cap 1316 (e.g., the first surface 1500 of the cap 1316). The example method 1900 ends at block 1910 with installing the antenna on, for instance, a satellite.

Figure 20:
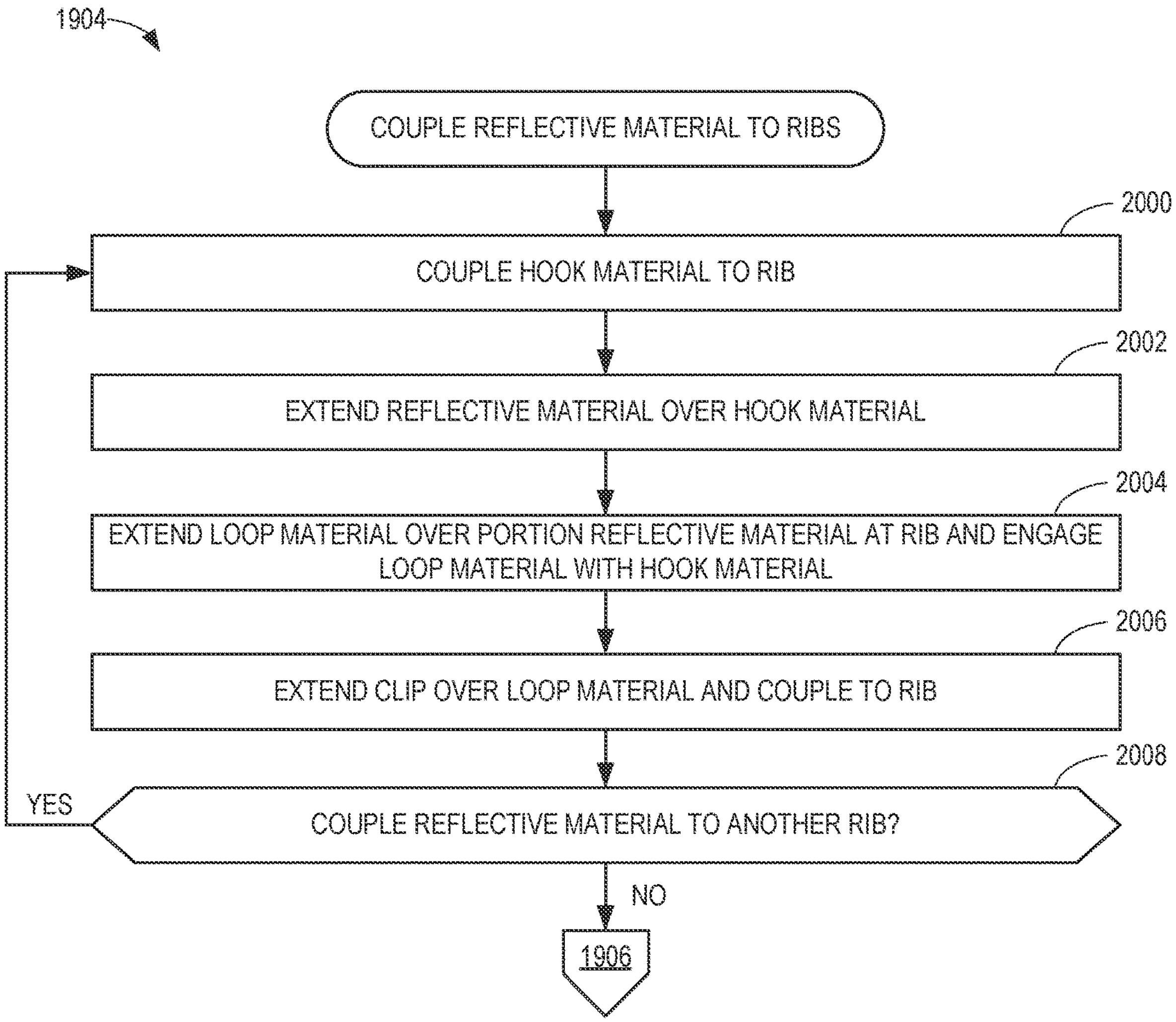
FIG. 20 is flowchart of an example method to couple a reflective material to ribs of the example antenna of FIGS. 1-12 and/or the example antenna of FIGS. 13-16 in accordance with teachings of this disclosure.

FIG. 20 illustrates an example method corresponding to block 1904 of FIG. 19 for coupling a reflective material to a rib. The reflective material can include, for example, a gold-plated mesh formed via weft knitting.

At block 2000 of the example method 1904, a hook material is coupled to a rib. For example, the hook material 1802 of FIG. 18 can be coupled to the rib 206, 1306, 1800 via, for instance, an adhesive.

At block 2002, the reflective material is extended over the rib. For example, the reflective material or mesh 1100, 1400, 1700 is laid over the hook material 1802 coupled to the rib 206, 1306, 1800.

At block 2004, a loop material is extended over the portion of the reflective material at the rib such that the loop material engages with the hook material. For example, the loop material 1804 is extended over the reflective material 1100, 1400, 1800 along the rib 206, 1306, 1800 such that the loop material 1804 engages with the hook material 1802.

At block 2006, a clip is extended over the loop material and coupled to the rib. For example, the clip 1704 is placed over the loop material 1804 such that the ends of the clip 1704 engage (e.g., couple to) the rib 206, 1306, 1800. The clip 1704 can include a gold-plated clip to, for instance, reduce passive intermodulation effects at the antenna 100, 1300 in view of the use of gold wire mesh 1100, 1400, 1700.

At block 2008, a determination is made as to whether the reflective material is to be coupled to another one of the ribs of the antenna. The example method 1904 proceeds to block 1906 of FIG. 19 when the reflective material is coupled to each of the ribs.

Although the example methods 1900, 1904 are described with reference to the flowcharts illustrated in FIGS. 19 and 20, many other methods of assembling an antenna may alternatively be used. For example, the order of execution of the blocks may be changed, and/or some of the blocks described may be changed, eliminated, or combined. Similarly, additional operations may be included in the example methods of FIGS. 19 and/or 20 before, in between, or after the blocks shown in FIGS. 19 and/or 20.

Figure 21:
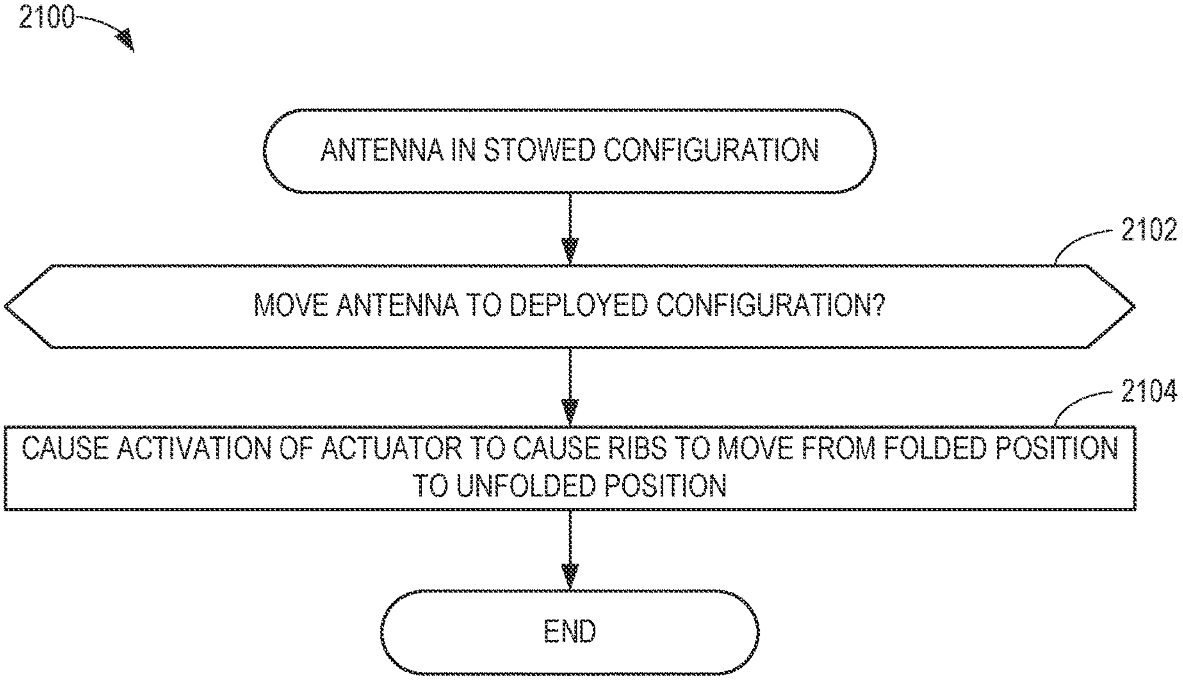
FIG. 21 is a flowchart representative of example machine readable instructions and/or example operations that may be executed by example processor circuitry to cause the example antenna of FIGS. 1-12 and/or the example antenna of FIGS. 13-16 to move from a stowed configuration to a deployed configuration.

FIG. 21 is a flowchart representative of example machine readable instructions and/or example operations 2100 that may be executed and/or instantiated by processor circuitry to cause an antenna to move from a stowed configuration to a deployed configuration. The machine readable instructions and/or the operations 2100 of FIG. 21 begin at block 2102, at which processor circuitry of a satellite carrying the antenna determines whether the antenna should be moved to the deployed configuration. For example, the processor circuitry 1104 may determine that that the antenna 100, 1300 of FIGS. 1-16 should be deployed when the satellite carrying the antenna 100, 1300 reaches an altitude for orbit.

At block 2104, when the antenna is to be deployed, the processor circuitry causes activation of an actuator of the antenna to cause the ribs of the antenna to move from a folded position to an unfolded position. For example, the processor circuitry 1104 causes the hold down mechanism 504 of the example antenna 100 to activate by instructing that heat be applied to the frangible portion 516 of the second fastener 512, which causes the frangible portion 516 to split, break, or otherwise separate from a second portion 518 of the second fastener 512. As a result, the mast 204 is no longer coupled to the second housing 508 of the hold down release mechanism 504 and the compression of the first spring 502 is released. The mast 204 extends. Also, the based or platform 300 is no longer held (e.g., fixed) in the housing 102 by the hold down release mechanism 504. The platform 300 raises to move the ribs 206 out of the housing 102 and enable the ribs 206 to unfold.

As another example, when the example antenna 1300 is to be deployed, the processor circuitry 1104 causes the hold down mechanism 1516 of the example antenna 100 to activate to retract the fastener 1518 into the support 1520 such that the fastener 1518 is no longer coupled to the second surface 1510 of the cap 1316. As a result, the spring 1522 is no longer held in compression and expands. The expansion of the spring 1522 causes a portion of the cap 1316 to lift and the ends 1314 of the ribs 1306 to be released from the coupling with the cap 1316. For example, the first surface 1500 of the cap 1316 rises above rib pins 1502. As a result, the ends 1314 of the respective ribs 1306 are released and the ribs 1306 to rotate away when the pins 1502 clear the rising first surface 1500. The ribs 1306 pivot outward about the base 1312 of the hub 1308 to the unfolded position via the hinges 1600.

The flowchart of FIG. 21 represents example machine readable instructions, which may be executed to configure the processor circuitry 1104 of FIG. 11. The machine readable instructions may be one or more executable programs or portion(s) of an executable program for execution by processor circuitry, such as the processor circuitry 2212 shown in the example processor platform 2200 discussed below in connection with FIG. 22. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 21, many other methods may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 21 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

Figure 22:
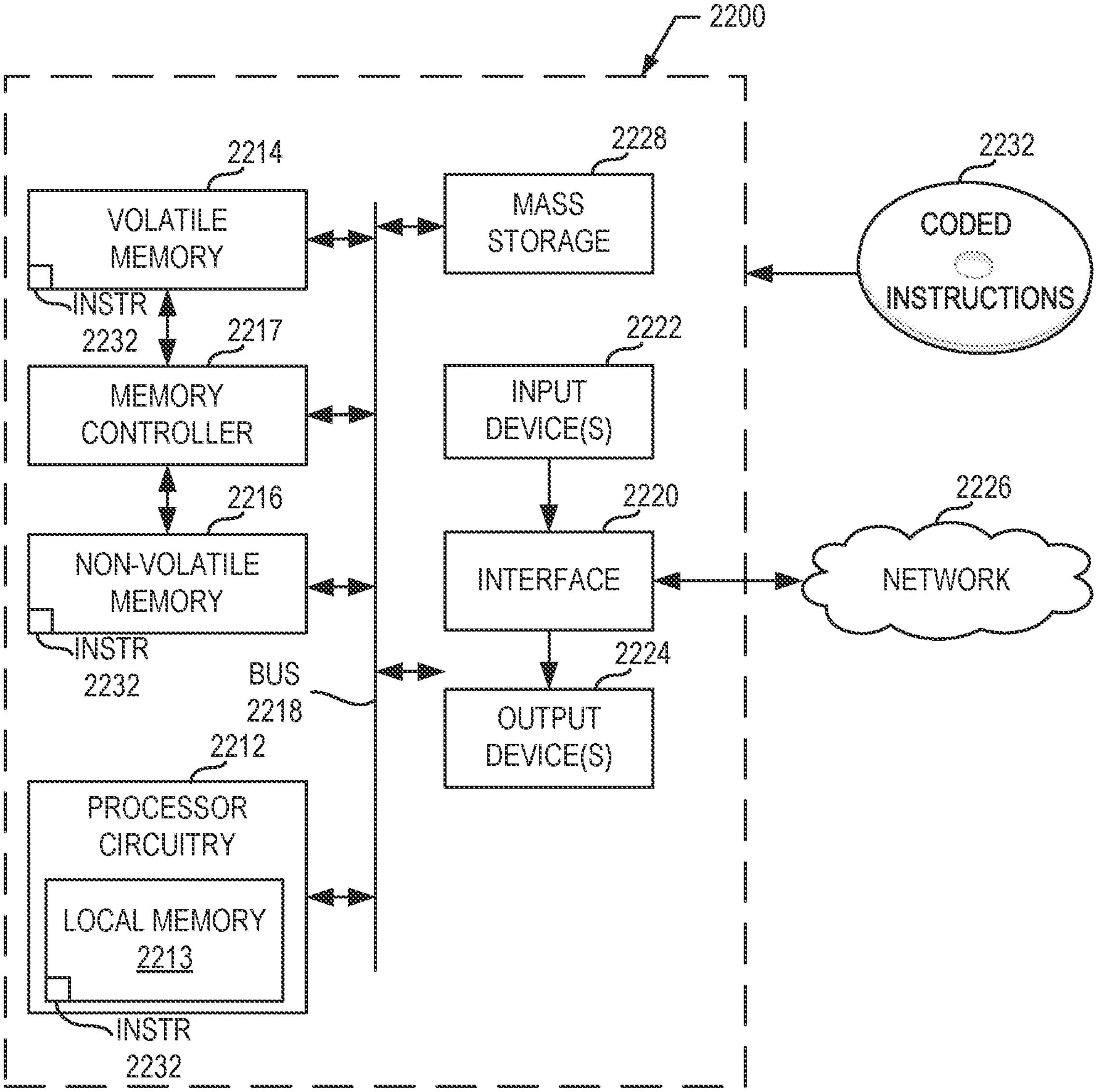
FIG. 22 is a block diagram of an example processing platform including processor circuitry structured to execute the example machine readable instructions and/or the example operations of FIG. 21.

FIG. 22 is a block diagram of an example processor platform 2200 structured to execute and/or instantiate the machine readable instructions and/or the operations of FIG. 21. The processor platform 2200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2200 of the illustrated example includes processor circuitry 2212. The processor circuitry 2212 of the illustrated example is hardware. For example, the processor circuitry 2212 can be implemented by one or more integrated circuits, logic circuits, FPGAs, microprocessors, CPUs, GPUs, DSPs, and/or microcontrollers from any desired family or manufacturer. The processor circuitry 2212 may be implemented by one or more semiconductor based (e.g., silicon based) devices.

The processor circuitry 2212 of the illustrated example includes a local memory 2213 (e.g., a cache, registers, etc.). The processor circuitry 2212 of the illustrated example is in communication with a main memory including a volatile memory 2214 and a non-volatile memory 2216 by a bus 2218. The volatile memory 2214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2216 may be implemented by flash memory and/or any other desired type of memory device. Access to the main memory 2214, 2216 of the illustrated example is controlled by a memory controller 2217.

The processor platform 2200 of the illustrated example also includes interface circuitry 2220. The interface circuitry 2220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2222 are connected to the interface circuitry 2220. The input device(s) 2222 permit(s) a user to enter data and/or commands into the processor circuitry 2212. The input device(s) 2222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2224 are also connected to the interface circuitry 2220 of the illustrated example. The output device(s) 2224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2220 of the illustrated example, thus, typically includes a graphics driver card, a graphics driver chip, and/or graphics processor circuitry such as a GPU.

The interface circuitry 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2200 of the illustrated example also includes one or more mass storage devices 2228 to store software and/or data. Examples of such mass storage devices 2228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 2232, which may be implemented by the machine readable instructions of FIG. 21, may be stored in the mass storage device 2228, in the volatile memory 2214, in the non-volatile memory 2216, and/or on a removable non-transitory computer readable storage medium such as a CD or DVD.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., “a”, “an”, “first”, “second”, etc.) do not exclude a plurality. The term “a” or “an” object, as used herein, refers to one or more of that object. The terms “a” (or “an”), “one or more”, and “at least one” are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that provide for antennas having ribs to support a reflective material (e.g., a mesh), where the ribs can be folded to provide for compact stowage of the antenna. The ribs are moved to an unfolded position via activation of a hold down release mechanism that causes the ribs to independently unfold via stored potential energy. The ribs support a reflective material, which can include a gold-plated mesh. In examples disclosed herein, the gold wire reflective material is coupled to the ribs via gold-plated clips that reduce effects of passive intermodulation due to the gold-plated interface between the reflective material and the clips.

Example reflector antennas and related methods are disclosed. Further examples and combinations thereof include the following:

Example 1 include an antenna comprising a hub; ribs coupled to the hub; a reflective material; gold-plated clips coupling the reflective material to respective ones of the ribs; and an actuator to cause respective ones of the ribs to move relative to the hub from a folded position to an unfolded position to expand the reflective material.

Example 2 includes the antenna of example 1, further including a housing to receive the hub, the ribs in the folded position when the hub is in the housing.

Example 3 includes the antenna of examples 1 or 2, wherein the actuator is to cause a portion of the hub to move exterior to the housing, the ribs to move from the folded position to the unfolded position when the portion of the hub is exterior to the housing.

Example 4 includes the antenna of any of examples 1-3, further including a first material coupled to a first one of the ribs, a portion of the reflective material disposed between the first material and a second material, a first one of the gold-plated clips disposed over the second material.

Example 5 includes the antenna of any of examples 1-4, where the hub includes a shaft and at least a portion of a first one of the ribs is to extend radially relative to the shaft when the first one of the ribs moves from the folded position to the unfolded position.

Example 6 includes the antenna of any of examples 1-5, wherein the first one of the ribs includes a first segment and a second segment, the second segment to move in response to movement of the first segment during unfolding of the first one of the ribs.

Example 7 includes the antenna of any of examples 1-6, wherein the reflective material includes a gold wire mesh.

Example 8 includes an antenna comprising a hub including a base and a shaft; a rib coupled to the base when the rib is in a folded position, the rib moveable relative to the shaft from the folded position to an unfolded position; a gold-plated mesh, a portion of the gold-plated mesh coupled to the rib; a gold-plated clip coupled to the rib, the portion of the gold-plated mesh between the gold-plated clip and the rib; and a hold down release mechanism to cause the rib to move from the folded position to the unfolded position to deploy the antenna, the gold-plated mesh to define a reflector portion of the antenna.

Example 9 includes the antenna of example 8, further including a hook material coupled to the rib and a loop material, the portion of the gold-plated mesh between the hook material and the loop material.

Example 10 includes the antenna of examples 8 or 9, wherein the rib is coupled to the base via a hinge, the rib to rotate about the base via the hinge when the rib moves from the folded position to the unfolded position.

Example 11 includes the antenna of any of examples 8 or 9, wherein the base includes an aperture and the rib includes a protrusion disposed in the aperture when the rib is in the folded position.

Example 12 includes the antenna of any of examples 8, 9, or 11, further including a housing, the hub disposed in the housing when the rib is in the folded position; and a spring, the spring to move from a compressed position to an extended position in response to activation of the hold down release mechanism, the spring to cause a portion of the base including the rib to move exterior to the housing when the spring moves from the compressed position to the extended position.

Example 13 includes the antenna of any of examples 8-10, wherein the hub includes a cap, the shaft between the base and the cap, the rib coupled to the cap when the rib is in the folded position.

Example 14 includes the antenna of any of examples 8-10 or 13, wherein the rib is coupled to the cap via a pin, the hold down release mechanism to cause the rib to release from the cap to cause the rib to move to the unfolded position.

Example 15 includes the antenna of any of examples 8, 9, 11, or 12, further including a mast and an antenna feed supported by the mast, the mast at least partially disposed in the shaft when the rib is in the folded position.

Example 16 includes an antenna comprising a base; a first rib and a second rib, the first rib and the second rib moveable relative to the base; a reflective material carried by the first rib and the second rib, the first rib, the second rib, and the reflective material to define a reflector portion of the antenna; and a gold-plated clip to couple a portion of the reflective material to the first rib.

Example 17 includes the antenna of example 16, wherein the reflective material includes a gold wire mesh formed via weft knitting.

Example 18 includes the antenna of examples 16 or 17, wherein the first rib includes a first segment and a second segment, the second segment pivotably coupled to the first segment.

Example 19 includes the antenna of any of examples 16-18, wherein the first rib is to move relative to the base from a folded position to an unfolded position when the second rib moves relative to the base from the folded position to the unfolded position.

Example 20 includes the antenna of any of examples 16-19, wherein the portion of the reflective material is disposed between a first material and a second material, the gold-plated clip extending over the second material.

Example 21 includes the antenna of any of examples 16, 17, 19, or 20, wherein the first rib is coupled to the base via a hinge, the first rib to rotate about the base via the hinge when the first rib moves from a folded position to an unfolded position.

Example 22 includes the antenna of any of examples 16, 17, or 19-21, further including a cap, a shaft between the base and the cap, the first rib coupled to the cap when the first rib is in a folded position.

Example 23 includes the antenna of any of examples 16, 17, or 19-22, wherein the first rib is coupled to the cap via a pin, and further including a hold down release mechanism to cause the first rib to release from the cap to cause the first rib to move to an unfolded position.

Example 24 includes an antenna comprising a housing; a hub; a rib carried by the hub, the rib including a first rib segment and a second rib segment, the hub moveable relative to the housing between a first position in which the rib is folded in the housing and a second position in which the rib is external to the housing; a reflective material; one or more gold-plated clips coupling the reflective material to the rib; and an actuator to cause hub to move relative to the housing from the first position to the second position, the second rib segment to move in response to movement of the first rib segment when the rib is external to the housing to unfold the rib.

Example 25 includes the antenna of example 24, wherein the second rib segment is coupled to the first rib segment via a joint including a rotation spring.

Example 26 includes the antenna of examples 24 or 25, wherein an end of the first rib segment includes a first protrusion, the first protrusion received in a first slot defined in the hub when the hub is in the first position.

Example 27 includes the antenna of any of examples 24-26, wherein an end of the second rib segment includes a second protrusion, the second protrusion received in a second slot defined in the hub when the hub is in the first position, the end of the second rib segment including the second protrusion opposite the end of the first rib segment including the first protrusion.

Example 28 includes the antenna of any of examples 24-27, wherein the rib includes a third rib segment coupled to the second rib segment and a fourth rib segment coupled to the third rib segment, the third rib segment to move in response to movement of the second rib segment, the fourth rib segment to move in response to the movement of the third rib segment.

Example 29 includes the antenna of any of examples 24-28, wherein the hub includes a shaft and a mast disposed in the shaft.

Example 30 includes the antenna of any of examples 24-29, wherein the actuator is to cause the mast to extend relative to the shaft when the hub is in the second position.

Example 31 includes the antenna of any of examples 24-30, further including a spring disposed in the shaft, the actuator to cause the spring to move from a compressed position to an expanded position to cause the mast to extend.

Example 32 includes the antenna of any of examples 24-31, wherein the reflective material includes a gold wire mesh formed via weft knitting.

Example 33 includes an antenna comprising a hub including a base, a rim disposed about the base, and a cap; a hinge coupled to the rim; a rib, a first end of the rib coupled to the hinge, the rib moveable between a folded position in which a second end of the rib is coupled to the cap and an unfolded position in which the second end of the rib is released from the cap; a reflective material; one or more gold-plated clips coupling the reflective material to the rib; and an actuator carried by the cap, the actuator to cause a portion of the cap to move to release the second end of the rib from the cap.

Example 34 includes the antenna of example 33, further including a pin to couple the second end of the rib to the cap.

Example 35 includes the antenna of examples 33 or 34, wherein the actuator includes a pin puller.

Example 36 includes the antenna of any of examples 33-35, wherein the hinge includes a spring, the rib to rotate about the spring when the second end of the rib is released from the cap.

Example 37 includes the antenna of any of examples 33-36, wherein the hinge is a first hinge, the rib is a first rib, and further including a second hinge and a second rib, a first end of the second rib coupled to the second hinge, a second end of the second rib coupled to the cap when the second rib is in the folded position, the second rib to move to the unfolded position in which the second end of the second rib is released from the cap in response to movement of the portion of the cap.

Example 38 includes the antenna of any of examples 33-37, wherein the reflective material extends between the first rib and the second rib, the first rib, the second rib, and the reflective material defining a reflector portion of the antenna when each of the first rib and the second rib are in the unfolded position.

Example 39 incudes the antenna of any of examples 33-38, wherein the actuator is to cause the portion of the cap to move away from the base.

Example 40 includes a satellite antenna comprising a hub; a plurality of ribs carried by the hub, each of the ribs moveable between a folded position and an unfolded position; a reflective material; a plurality of gold-plated clips to couple the reflective material to the respective ones of the ribs, the reflective material folded when the ribs in are in the folded position; and an actuator to cause the ribs to move from the folded position to the unfolded position to expand the reflective material.

Example 41 includes the satellite antenna of example 40, wherein the reflective material includes a gold-plated mesh.

Example 42 incudes the satellite antenna of examples 40 or 41, wherein the ribs include a carbon fiber material.

Example 43 includes the satellite antenna of any of examples 40-42, wherein a first one of the plurality of ribs is to move from the folded position to the unfolded position when a second one of the plurality of ribs moves from the folded position to the unfolded position.

Example 44 includes the satellite antenna of any of examples 40-43, further including a first material extending along at least a portion of a first one of the plurality of ribs and a second material extending along at least the portion of the first one of the plurality of ribs, the reflective material disposed between the first material and the second material, a first one of the plurality of the gold-plated clips disposed over the second material to couple with the first one of the plurality of the ribs.

Example 45 includes the satellite antenna of any of examples 40-44, wherein each of the ribs is hingedly coupled to the hub.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An antenna comprising:

a hub including a base, a rim disposed about the base, and a cap;

a hinge coupled to the rim;

a rib, a first end of the rib coupled to the hinge, the rib moveable between a folded position in which a second end of the rib is coupled to the cap and an unfolded position in which the second end of the rib is released from the cap;

a reflective material;

one or more gold-plated clips coupling the reflective material to the rib; and an actuator carried by the cap, the actuator to cause a portion of the cap to move to release the second end of the rib from the cap.

2. The antenna of claim 1, further including a pin to couple the second end of the rib to the cap.

3. The antenna of claim 1, wherein the actuator includes a pin puller.

4. The antenna of claim 1, wherein the hinge includes a spring, the rib to rotate about the spring when the second end of the rib is released from the cap.

5. The antenna of claim 1, wherein the hinge is a first hinge, the rib is a first rib, and further including a second hinge and a second rib, a first end of the second rib coupled to the second hinge, a second end of the second rib coupled to the cap when the second rib is in a folded position, the second rib to move to an unfolded position in which the second end of the second rib is released from the cap in response to movement of the portion of the cap.

6. The antenna of claim 5, wherein the reflective material extends between the first rib and the second rib, the first rib, the second rib, and the reflective material defining a reflector portion of the antenna when each of the first rib and the second rib are in the unfolded positions.

7. The antenna of claim 1, wherein the actuator is to cause the portion of the cap to move away from the base.

8. An antenna comprising:

a hub including a base, a rim disposed about the base, and a cap;

a hinge coupled to the rim;

a first rib and a second rib, the first rib and the second rib moveable relative to the base, a first end of the first rib coupled to the hinge, the first rib moveable between a folded position in which a second end of the first rib is coupled to the cap and an unfolded position in which the second end of the first rib is released from the cap;

a reflective material carried by the first rib and the second rib, the first rib, the second rib, and the reflective material to define a reflector portion of the antenna;

a gold-plated clip to couple a portion of the reflective material to the first rib; and an actuator carried by the cap, the actuator to cause a portion of the cap to move to release the second end of the first rib from the cap.

9. The antenna of claim 8, wherein the reflective material includes a gold wire mesh formed via weft knitting.

10. The antenna of claim 8, wherein the second rib is to move relative to the base from a folded position to an unfolded position when the first rib moves relative to the base from the folded position to the unfolded position.

11. The antenna of claim 8, wherein the portion of the reflective material is disposed between a first material and a second material, the gold-plated clip extending over the second material.

12. The antenna of claim 8, further including a shaft between the base and the cap, the portion of the cap to move away from the shaft.

13. The antenna of claim 8, wherein the first rib is coupled to the cap via a pin, and further including a hold down release mechanism to cause the second end of the first rib to release from the cap to cause the first rib to move to the unfolded position.

14. A satellite antenna comprising:

a hub including a base, a rim disposed about the base, and a cap;

a hinge coupled to the rim;

a plurality of ribs carried by the hub, each of the ribs moveable between a folded position and an unfolded position, the plurality of ribs including a first rib, a first end of the first rib coupled to the hinge, a second end of the first rib coupled to the cap when the rib is in the folded position, the second end of the first rib released from the cap when the first rib is in the unfolded position;

a reflective material;

a plurality of gold-plated clips to couple the reflective material to respective ones of the ribs, the reflective material folded when the ribs in are in the folded position; and an actuator carried by the cap, the actuator to cause a portion of the cap to move to cause the ribs to move from the folded position to the unfolded position to expand the reflective material.

15. The satellite antenna of claim 14, wherein the reflective material includes a gold-plated mesh.

16. The satellite antenna of claim 14, wherein the ribs include a carbon fiber material.

17. The satellite antenna of claim 14, wherein a second rib of the plurality of ribs is to move from the folded position to the unfolded position when the first rib moves from the folded position to the unfolded position.

18. The satellite antenna of claim 14, further including a first material extending along at least a portion of the first rib and a second material extending along at least the portion of the first rib, the reflective material disposed between the first material and the second material, a first one of the plurality of the gold-plated clips disposed over the second material to couple with the first rib.

19. The satellite antenna of claim 14, wherein the hinge is a first hinge of a plurality of hinges and each of the ribs is coupled to the rim via respective ones of the plurality of hinges.

20. The satellite antenna of claim 19, wherein each of the hinges includes a stop, a degree of curvature of the reflective material defined by the stops when the ribs are in the unfolded position.

* * * * *